United States Patent [19]
Hisey

[11] Patent Number: 5,825,901
[45] Date of Patent: *Oct. 20, 1998

[54] ROTARY LOW-FREQUENCY SOUND REPRODUCING APPARATUS AND METHOD

[76] Inventor: Bradner L. Hisey, 19325 Athos Pl., Saratoga, Calif. 95070

[*] Notice: The term of this patent shall not extend beyond the expiration date of Pat. No. 5,191,618.

[21] Appl. No.: 505,334

[22] PCT Filed: Feb. 26, 1993

[86] PCT No.: PCT/US93/01824

§ 371 Date: Aug. 18, 1995

§ 102(e) Date: Aug. 18, 1995

[87] PCT Pub. No.: WO94/19914

PCT Pub. Date: Sep. 1, 1994

[51] Int. Cl.$^6$ ................................................. H04R 25/00
[52] U.S. Cl. ........................... 381/165; 381/153; 318/119
[58] Field of Search ................................. 381/153, 156, 381/165, 166, 158; 340/388, 390, 391, 404; 318/119

[56] References Cited

U.S. PATENT DOCUMENTS

| | | | |
|---|---|---|---|
| 4,136,971 | 1/1979 | Varlamov et al. | 366/169 |
| 4,525,657 | 6/1985 | Nakase et al. | 318/254 |
| 4,564,727 | 1/1986 | Danley et al. | 179/116 |
| 4,625,657 | 12/1986 | Little et al. | 108/93 |
| 4,703,236 | 10/1987 | Janssen | 318/254 |
| 4,763,358 | 8/1988 | Danley | 381/156 |
| 4,874,975 | 10/1989 | Hertrich | 310/186 |
| 5,140,641 | 8/1992 | Danley et al. | 381/156 |
| 5,191,618 | 3/1993 | Hiesey | 581/158 |

FOREIGN PATENT DOCUMENTS

| | | |
|---|---|---|
| 0 051 478 | 5/1982 | European Pat. Off. . |
| 1 493 956 | 7/1967 | France . |

*Primary Examiner*—Huyen Le
*Attorney, Agent, or Firm*—Skjerven, Morrill, MacPherson, Franklin & Friel; Alan H. MacPherson

[57] ABSTRACT

Apparatus (21) is described for reproducing low frequency sound in response to an applied electrical signal having a rotary acoustic radiator (22) comprised of a chamber (26) having a rotor assembly (58) including a shaft (61) and movable vanes (71, 72) secured to the shaft rotatably mounted in chamber for rotation on a longitudinal axis. Stationary vanes (62, 63) are mounted in the chamber and extend generally radially between the chamber walls and the shaft. The chamber has ports (64, 66, 67, 68) therein opening into the chamber and disposed adjacent the stationary vanes on opposite sides of said stationary vanes. The movable vanes are disposed on opposite sides of the stationary vanes and extend generally radially between the chamber walls and the shaft.

45 Claims, 10 Drawing Sheets

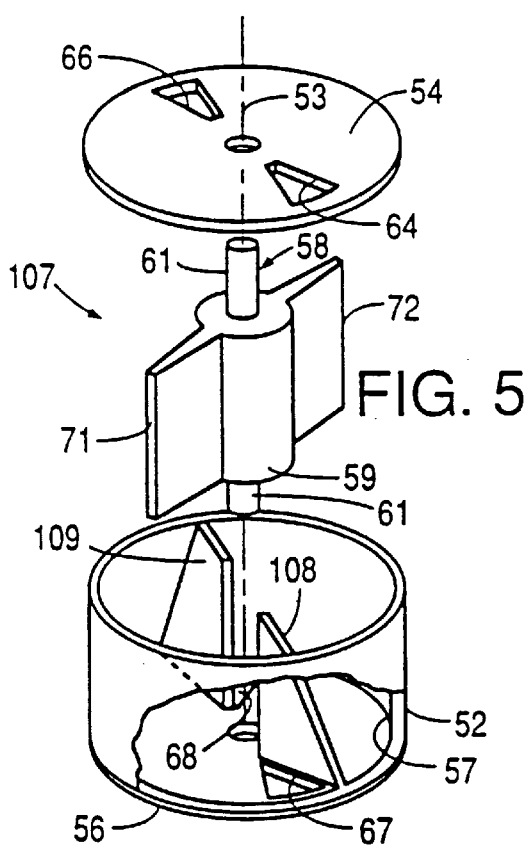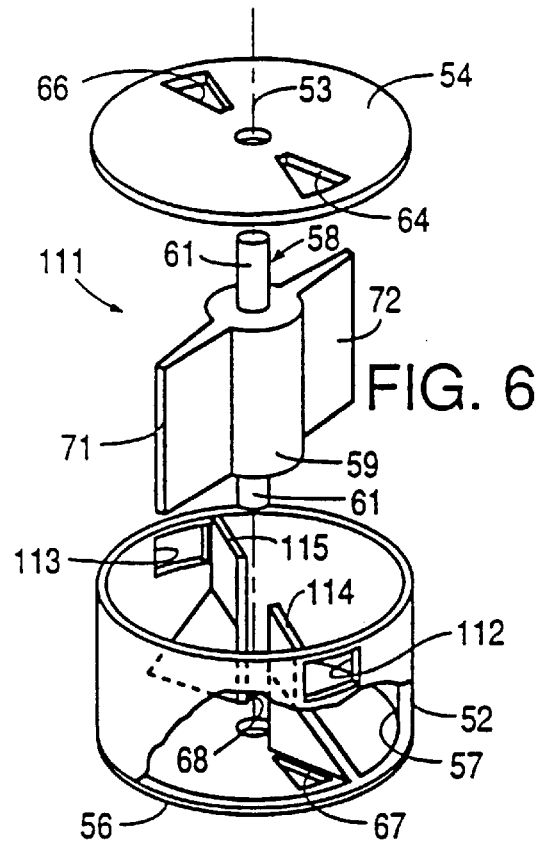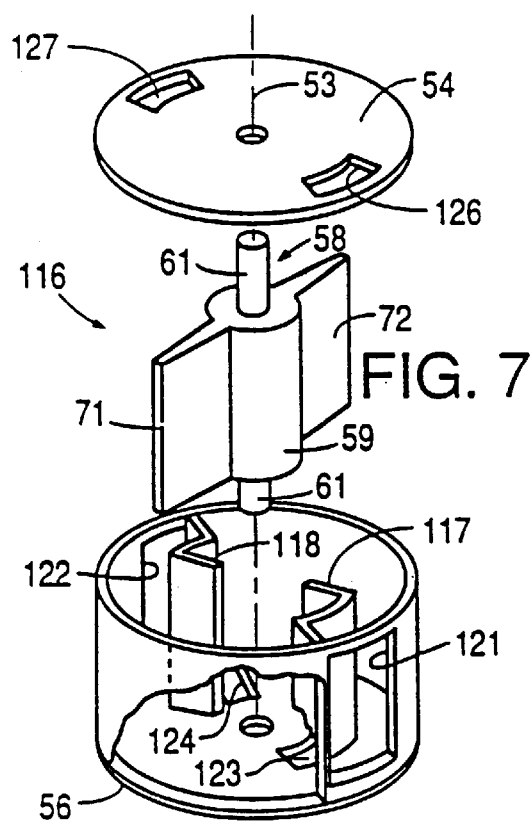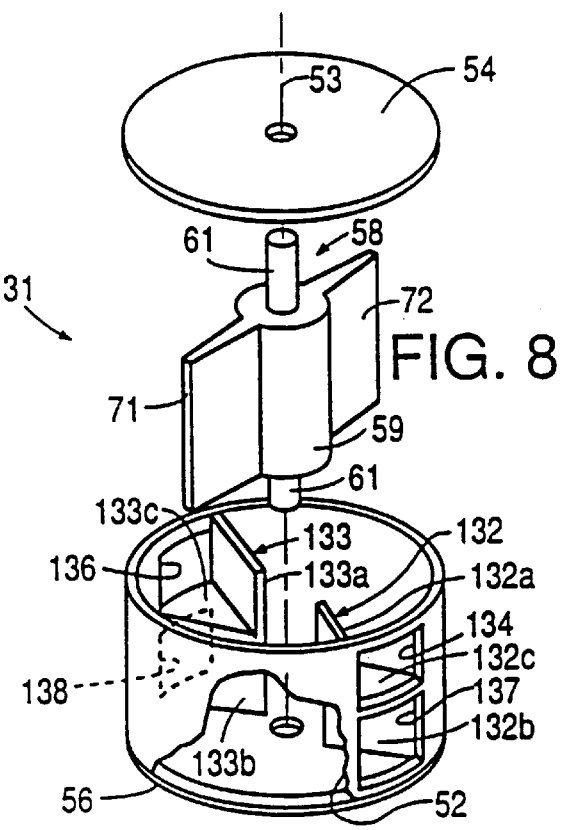

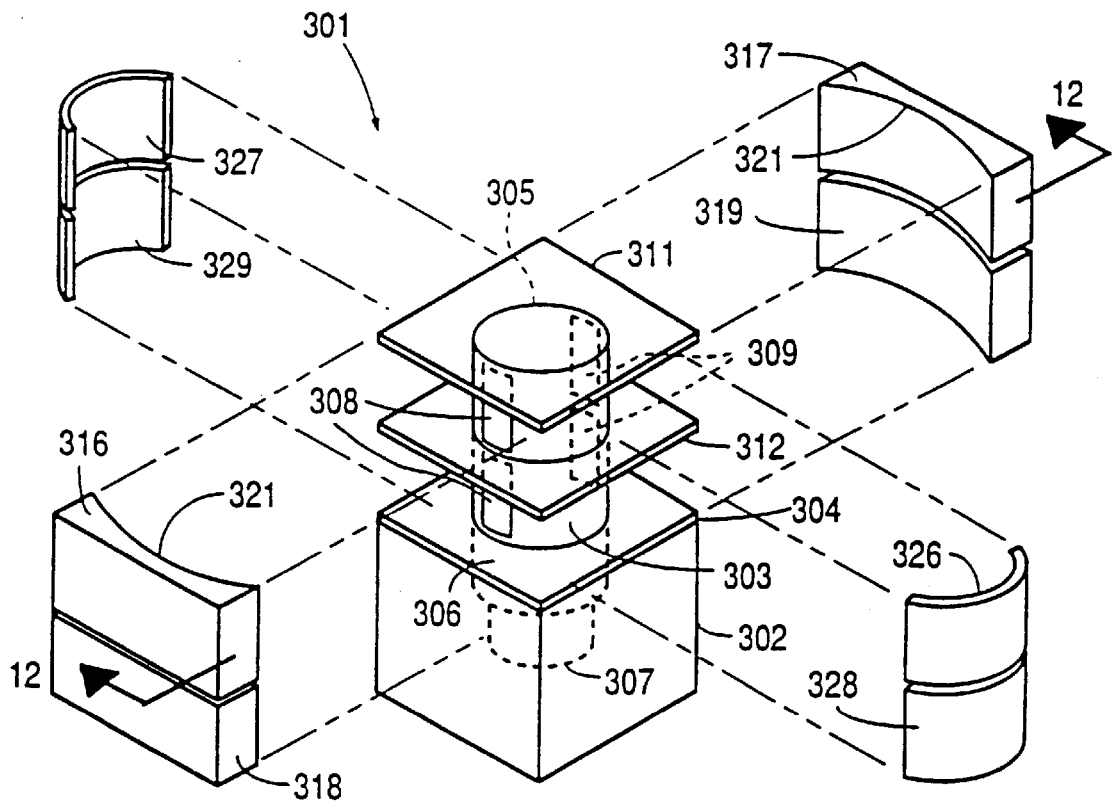
FIG. 11
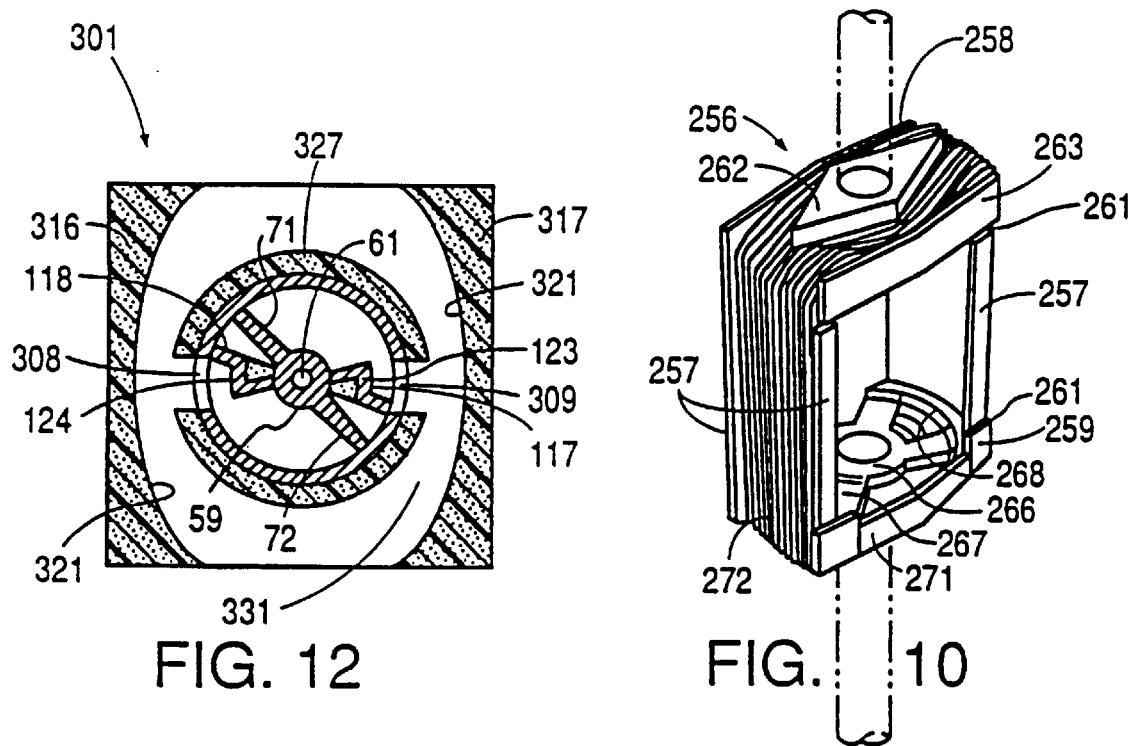
FIG. 12
FIG. 10

ROTARY LOW-FREQUENCY SOUND REPRODUCING APPARATUS AND METHOD

The invention relates to a rotary low frequency sound reproducing apparatus and method and more particularly to a computer-aided rotary electromechanical transducer and method for reproduction of sound in the first two octaves of the audible frequency spectrum.

BACKGROUND OF THE INVENTION

The reproduction of the first two octaves of audible low-frequency sound, from 20 to 80 Hz, is a long-standing problem in that large volumes of air must be moved. For a given loudness of a reproduced low-frequency sound, the air volume moved must be doubled for each halving of reproduced sound frequency.

Many solutions have been attempted. Low-frequency voice-coil-and-cone loudspeakers with highly compliant suspensions have been used. However, the long cone travels needed are difficult to achieve with linearity. Nonlinearities introduce intermodulation distortion, the modulation of higher reproduced frequencies by lower reproduced frequencies. More serious attempts to produce the lowest frequencies in sound isolate the lower two octaves from higher frequencies for reproduction through "subwoofer" loudspeakers.

Direct radiator voice-coil-and-cone loudspeakers, which have at best an efficiency of a few percent, have been used as subwoofers in 12 to 30 inch frame sizes in large cabinets of several cubic feet in volume. Required driving powers are also large, typically several hundred watts. Subwoofer low-frequency response is limited by resonance of the voice-coil-and-cone masses in combination with compliance of the voice-coil support "spider", the cone flexible surround, and the air compliance of a closed cabinet, if used. Together these set an effective lower limit to the frequencies of output sound since it is difficult to drive a loudspeaker below its low-frequency resonance. Closed-loop (negative feedback) servomechanisms controlling voice-coil movements have been used to reduce these effects but they may leave the cone and flexible surround free to flex in unwanted modes at high amplitude, limiting usable power output by the onset of distortion.

In auditoria and stadia, horn-type radiators driven by fairly conventional voice-coil-and-cone transducers have also been used as subwoofers with efficiencies in the 30 to 50 percent range. Their limitation in the domestic environment is that for reasonable performance the perimeter of the horn mouth must be of the order of the wavelength of the lowest reproduced sound, e.g., over 50 20 feet at 20 Hz. Recently, horns of the type disclosed in U.S. Pat. No. 4,564,727 have been driven from externally cooled servomotors through pulley, belt, and cone arrangements, achieving remarkable sustained acoustic outputs.

Most recently, in U.S. Pat. No. 4,763,358, the use of a positive-displacement rotary-vane pump is disclosed. If of suitable size it should be able to produce usable output to and below the 20 Hz limit of audibility. The rotary vane pump may be used to drive a horn, though the required horn mouth size (above) practically excludes it from the domestic user environment. If used as a direct radiator, rotary vane pump efficiency is similar to that of voice-coil-and-cone direct radiators. At high output, most of the input power must be dissipated as heat, usually from within a closed cabinet. Though their volumetric efficiency is high relative to that of voice-coil-and-cone loudspeakers, since much of rotary vane device volume may be swept by the vanes, the devices and their cabinetry can be large. Cabinetry structure for devices having only full-length ports in pump-enclosure sidewalls is awkward. Motor wear and noise, bearing noise, and seal-leakage noise can be problematic in a quiet, e.g., home or auto, user environment. Port-turbulence noise must be managed—a nominal 15 inch diameter, 9 inch long rotary acoustic radiator moves about 6 times the air volume in a single stroke as does a conventional 15 inch loudspeaker.

Position sensing has heretofore been disclosed for rotary acoustic radiators to provide negative feedback information active in the same frequency band as the acoustic output and linearize vane travel. This approach has been used successfully in voice-coil-and-cone loudspeakers, which are linear at null or neutral position. Rotary acoustic transducers are not linear at null. The support bearings of rotary devices have static friction differing severalfold from dynamic friction, and both static and dynamic friction vary with temperature and time. Dynamic friction, determined more by grease seals than by the bearings themselves, increases with rotational velocity.

Bearing, slip ring, and motor-brush static friction induce distortion at low output amplitudes. Total breakaway (from stop) torques, which are typically 2 percent of full motor torque, are 20 percent of torque when the audio output level is down 20 db, and further increase the relative distortion level with decreasing output. Since the usual dynamic range of entertainment audio is 40 to 50 db, such distortions at mid and low amplitudes are serious problems. Commutation discontinuities and irregularities of motor magnetic fields also contribute somewhat unpredictably to low-amplitude output distortion, as their magnitude is often a discontinuous function of motor armature rotational position.

Negative feedback adequate to contain these nonlinearities to a user-acceptable level would likely be 14 db or more, implying a corollary unity-gain negative feedback loop crossover in the region of 300 Hz or higher. Stability is difficult to assure over a subwoofer's life with such nonlinear electromechanical components and high bandwidth in a negative feedback loop.

Commutated motors, when used to drive acoustic transducers, introduce a special problem. A wide variety of techniques have been employed to reduce the characteristic of commutated motors commonly referred to as torque cogging or torque ripple, hereinafter referred to as torque ripple, which is the principal distortion-generating limitation of commutated motors when employed in rotary acoustic transducers. These ripple effects occur when windings connected to rotationally adjacent commutator sectors are shunted together by brushes. Brushless motors having multiple permanent magnet rotors and multiphase stator windings, particularly those having precision angular position information available for use in commutation such as computer memory disk drives and the rotary acoustic transducer of this invention, can be commutated without the positional uncertainty and torque ripple arising through use of mechanical brushes. With electronic commutation angular gaps may be introduced between stator connections during commutation to minimize inductive and ferromagnetic hysteresis effects in stator windings during phase connection and disconnection, as in Janssen U.S. Pat. No. 4703236. Separate windings for each pole set in a multiphase motor which share a single driving source, such as a power amplifier, can limit the electromagnetic disturbance during an event of commutation to one or two pole sets, rather than disturbing the entire stator during each commutation as in conventional lap or wave stator winding patterns wherein all stator poles share the same winding circuit.

Torque ripple is reduced by the accurate commutation described hereinabove. Nevertheless in brushless motors stator winding commutation generally occurs adjacent to rotor pole edges and is a source of torque ripple as stator pole magnetic flux reverses and stator pole flux transfers from one rotor pole to the next. Additional sources of torque ripple are cogging of the rotor from pole to pole of the stator due to uneven flux distribution across pole faces and winding slots, flux variations across the faces of stator poles themselves, and pole saturation. These sources of torque ripple have been compensated by using large numbers of stator poles; using numbers of rotor and stator poles which are not multiples or submultiples of each other; skewing the stator poles from their usual radial or axial alignments in axial-gap and radial-gap motors, respectively; shaping the stator pole faces, as with surface depressions, to produce a desired flux distribution, as in Hertrich, U.S. Pat. No. 4,874,975; and modulating the stator winding drive current with a repetitive pattern in synchrony with the multipole rotor assembly angular rotation over stator poles, as in Gotoh et al., U.S. Pat. No. 4,525,657.

There is therefore a need to address these problems of low-frequency sound transducers, and in particular rotary-vane transducers, to produce a low-frequency sound reproducing apparatus and method more suitable for the consumer environment.

THE DRAWINGS

FIGS. 3 through 8 are exploded isometric views of the rotary acoustic radiator assembly with certain portions being broken away.

FIG. 10 is an isometric view of the armature shown in FIG. 9.

FIG. 11 is a partially exploded, isometric view of an alternative loudspeaker cabinet and diffuser-attenuator incorporating certain aspects of the rotary acoustic transducer apparatus of the present invention.

FIG. 12 is a cross sectional view taken along the line 12—12 of FIG. 11 but in an unexploded condition.

DESCRIPTION OF THE PREFERRED EMBODIMENTS

The rotary acoustic transducer apparatus of the present invention is used for producing low frequency sound in response to an applied audio signal. It is comprised of a rotary acoustic radiator assembly, a torque motor, a position sensor and a microcomputer. The apparatus may also be provided with a supporting cabinet. The radiator assembly comprises a generally cylindrical means with a cylindrical side wall and end walls forming a cylindrical chamber having an axis. A shaft is provided. Bearings mount the shaft in the cylindrical means for rotation about said axis. A cylindrical hub is secured to the shaft and extends between the end walls. Movable vanes are secured to the shaft. The shaft and hub and movable vanes form a rotor assembly. Stationary vanes are mounted in the chamber between said moving vanes and extend between the cylindrical side wall and the hub and between the end walls. The cylindrical means has ports opening through the cylindrical chamber walls to permit air flow into and out of the cylindrical chamber in response to movement of the movable vanes. A torque motor is coupled to the shaft for applying rotational reciprocating movement to the movable vanes. A position sensor, which may use direct rotational position sensing or indirect rotational position sensing by integration of velocity or acceleration, ascertains the position of said rotor assembly. Typically an incremental position sensor would be used to provide high resolution at low cost, but alternatively absolute position sensors may be used — they do not require a separate indexing line or procedure as described hereinbelow. A microcomputer is provided and is coupled to the torque motor and to the position sensor and controls the operation of the torque motor in accordance with the applied audio signal. Nonlinearities arising in the torque motor, bearings, seals, and cabinet are measured by the position sensor and microcomputer and correcting signals created to modify the applied audio signal. Displaced air may be used as a torque motor coolant. A diffuser-attenuator slows user-side airflows and permits small user-side ports to be used, increasing volumetric efficiency. The diffuser-attenuator is fabricated partially of acoustically-absorbent materials to attenuate vane-edge leakage noise and port-turbulence noise.

Figure 1:
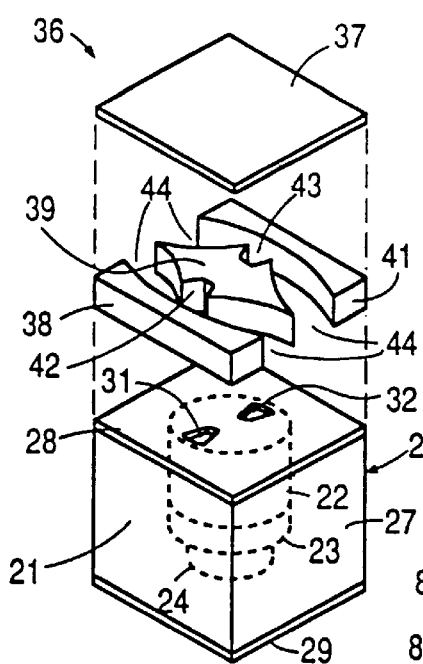
FIG. 1 is a partially exploded, isometric view of a loudspeaker cabinet incorporating the rotary acoustic transducer apparatus incorporating the present invention.

More particularly, as shown in FIG. 1 of the drawings, the rotary low-frequency sound producing apparatus 21 which alternatively can be called a rotary acoustic transducer apparatus is comprised of rotary acoustic radiator assembly 22, a torque motor 23 and a position sensor 24, said apparatus typically being supported by a cabinet 26. A typical cabinet 26 is provided with four side walls 27, a top wall 28 and a bottom wall 29 to form a rectangular cabinet or enclosure. The top wall 28 is provided with ports 31 and 32. The rotary acoustic radiator assembly 22 is secured to the wall 28 by suitable means, such as bolts (not shown) so that the ports 31 and 32 in the cabinet top wall 28 register with the ports hereinafter described in the rotary acoustic radiator assembly 22. Cabinet minimum volume is in the range of three to ten times the maximum air volume which may be displaced by the rotary acoustic radiator assembly 22 in a single stroke of the rotary acoustic radiator assembly 22.

A diffuser-attenuator 36 is comprised of a top planar baffle 37 overlying and spaced upwardly from the cabinet top wall 28. The top baffle 37 has approximately the same area as the top wall of the cabinet 26, and is spaced upwardly from the cabinet top wall 28 a suitable distance, as for example one fourth of the diameter of the rotary acoustic radiator assembly diameter 22. Fixed air duct baffle means 38, 39, and 41 are provided between the top baffle 37 and the cabinet top wall 28. The top baffle 37 is supported on the cabinet top wall 28 by spacer and bolt assemblies (not shown) placed as appropriate to support the top baffle 37 and inhibit vibration of the top baffle 37. Air from the ports 31 and 32 enters the diffuser-attenuator 36 through slots 42 and 43 and is redirected so that it exits in the four mouths 44 in the diffuser-attenuator between the top baffle 37 and cabinet top wall 28. Air exiting from the ports 31 and 32 of the cabinet 26 can have considerable kinetic energy which, as the air passes through the diffuser-attenuator 36, is converted to potential energy in a sound wave by reducing air velocity. Air entering the ports 31 and 32 is driven by the potential energy of ambient air pressure and is shaped into a rapidly-moving air column. Though nomenclature is similar, no attempt is made to make the diffuser-attenuator 36 function as a traditional acoustic horn radiator.

Figure 2A:
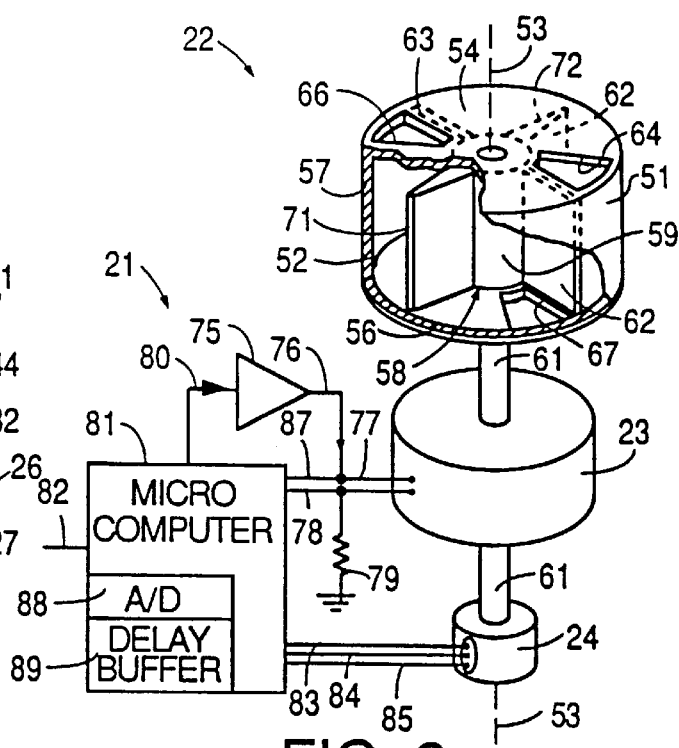
FIG. 2a is a schematic isometric exploded view of the rotary acoustical transducer apparatus with certain portions broken away and an overview of its control system.

FIG. 2a is a schematic illustration of the low-frequency sound reproducing apparatus 21 without a cabinet 26. As shown, the rotary acoustic radiator assembly 22 consists of a right circular cylinder or enclosure 51 formed by a cylindrical sidewall 52 which has a longitudinal axis 53. First and second or top and bottom spaced apart parallel circular end walls 54 and 56 adjoin the cylindrical sidewall 52 to form a closed cylindrical chamber 57. A rotor assembly 58 is mounted in the right circular cylindrical chamber 57 and is comprised of a cylindrical hub 59 which is adapted to rotate on the longitudinal axis 53 coaxial with the cylindrical sidewall 52 by a shaft 61. The cylindrical hub 59 extends between the first and second end walls 54 and 56 and is rotatably carried by the shaft 61. The shaft 61 extends coaxially of the hub 59 and is rotatably mounted in the end walls 54 and 56 by suitable anti-friction bearings (not shown). In the embodiment of the invention shown in FIG. 2, the shaft 61 extends through the second end wall 56 for a purpose hereinafter described. It should be appreciated that if desired, the shaft 61 can be formed in two parts and need not necessarily extend through the hub 59. For example, the two parts may be secured to opposite ends of the hub 59.

First and second stationary vanes 62 and 63 (see FIGS. 2 and 3) are mounted within the chamber 57 of the right circular cylinder means 51 and extend radially of the chamber 57 between the cylindrical sidewall 52 and the hub 59 and between the first and second end walls 54 and 56. Thus, as shown the stationary vanes 62 and 63 can be secured to the cylindrical sidewall 52 and the first and second end walls 54 and 56 and can extend into very close proximity to the hub 59 but not touching same so as to frictionally engage the hub and impede rotational movement of the rotor assembly 58.

Figure 3:
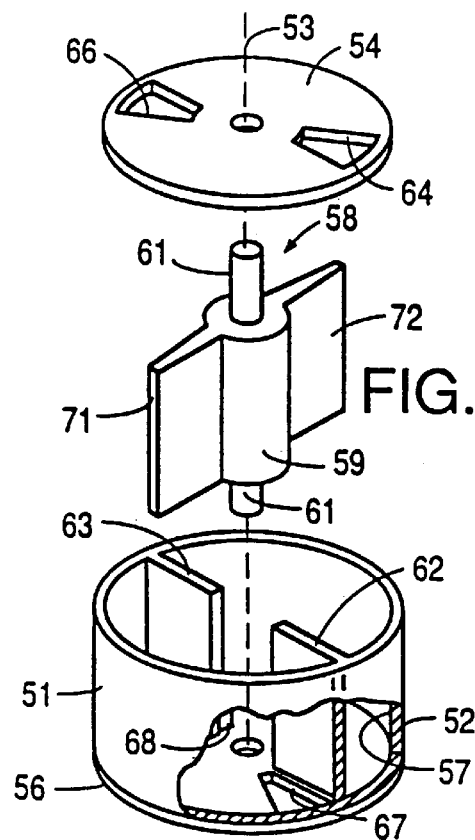

First and second ports 64 and 66 in the form of radial sectors are provided in the first end wall 54 and are disposed counterclockwise adjacent to the stationary vanes 62 and 63. Thus, as shown in FIGS. 2 and 3, a port 64 is provided in end wall 54 adjacent to stationary vane 62 and a port 66 is provided in the end wall 54 adjacent to the stationary vane 63. In a similar manner ports 67 and 68 in the form of radial sectors are disposed in the second end wall 56 clockwise adjacent to stationary vanes 62 and 63, respectively. The ports 64, 66, 67 and 68 may have a wide variety of configurations, as described hereinafter.

The rotor assembly 58, in addition to the hub 59 and the shaft 61 includes first and second movable vanes 71 and 72 which are secured to the hub 59 and extend radially therefrom into very close proximity to the cylindrical sidewall 52. They also extend between the first and second end walls 54 and 56 but do not frictionally engage them. The movable vanes 71 and 72 may be tapered as shown to provide greater thickness and strength at the roots or proximal extremities of the vanes to resist motor torque while being narrower at the tips or distal extremities to provide low mass and hence low rotational moment of inertia. The movable vanes 71 and 72, which are subject to large accelerating torques from the torque motor 23 and large air pressure forces generated within a cabinet 26, must necessarily have a rigid structure. These rigid structures are not a source of harmonic distortion as are the more flexible cone and cone-surround components of a conventional loudspeaker.

The large hub 59 reduces the angle about the longitudinal axis 53 subtended by the thickness of the inner or axial margins of the stationary vanes 62 and 63 while containing the robust structure including the hub 59 securing the movable vanes 71 and 72 to the shaft 61. Most of the hub included volume may be structural foamed plastic which contributes little to the rotational moment of inertia of the rotor assembly 58.

The right circular cylinder 51 and the stationary vanes 62 and 63 and movable vanes 71 and 72 may be formed of a number of suitable materials such as metal or composites provided they are dimensionally stable and have closely matched thermal expansion characteristics. Use of the rotary acoustic radiator assembly 22 as a heat sink for the torque motor 23 favors the use of high-thermal-conductivity metal such as aluminum for these components.

The control functions of the rotary acoustic radiator assembly 21 are discussed in some detail hereinbelow; an overview is shown in FIG. 2a. The torque motor 23 serves as means for applying rotational reciprocating movement to the rotor assembly 58 through the shaft 61. The drive signal to the torque motor 23 is provided by a power amplifier 75 through lines 76 and 77 with a ground return line 78 connected to ground through a low resistance armature-current sampling resistor 79. A driving signal for the power amplifier 75 is provided on a line 80 from a microcomputer 81 which has as its primary input a low-frequency audio signal applied on line 82. The position sensor 24 provides position information of the rotor assembly 58 to the microcomputer 81 through lines 83 and 84. Another line 85 from the sensor 24 to the microcomputer 81 serves as a ground line. Armature current information is provided to the microcomputer 81 on a line 78 in the form of the voltage drop across resistor 79. Line 87 to the microcomputer 81 samples the drive voltage applied to the torque motor 23.

In FIG. 2a the microcomputer 81 includes analog to digital (A/D) and digital to analog (D/A) converters 88 for converting signals between analog and digital forms as appropriate for processing in the microcomputer 81 and other electronic components of the rotary transducer assembly 21. The microcomputer 81 also includes a delay buffer 89 for management of distortion, as described hereinafter. Alternatively A/D, D/A, delay buffer, rotor assembly 58 position, angular velocity, and angular acceleration functions may be determined with circuitry external to the microcomputer 81, as for example an application-specific integrated circuit (ASIC). This configuration is shown in the more detailed drawing of the control system FIG. 2b.

Operation of the rotary transducer assembly 21 shown in FIGS. 2a and 3 may now be described. As the shaft 61 is rotated counterclockwise by the torque motor 23, the hub 59 and the movable vanes 71 and 72 secured thereto are moved to cause air to be drawn into (inducted into) the ports 64 and 66 at the first end wall 54 of the right circular cylinder 51 and air forced out of (exhausted from) the ports 67 and 68 on the second end wall 56 of the right circular cylinder 51. When rotation of the hub 59 and the movable vanes 71 and 72 is reversed, air is exhausted from the ports 64 and 66 and inducted into ports 67 and 68. Air leakage between the movable vanes 71 and 72 and the cylinder sidewall 52 and the end walls 54 and 56 and between the stationary vanes 62 and 63 and the hub 59 is limited by providing very close fits between the same, typically one one-thousandth of the internal diameter of the cylinder sidewall 52.

As described hereinabove, a rotary acoustic transducer assembly 21 includes a number of distortion sources which must be corrected or compensated to produce a user-satisfactory apparatus. These corrections are first derived in a startup protocol; some are updated during subsequent operation of the apparatus.

When power is first applied the microcomputer 81, in conjunction with the A/D and D/A converters 88, the power amplifier 75, the signal delay buffer 89, the position sensor 24 and the armature current-sensing resistor 79, performs a number of initializing functions in a startup protocol comprised of rotor assembly 58 centering, torque motor 23 linearity calibration, damage-protection braking table generation, cabinet 26 volume measurement, rotor assembly 58 air leakage measurement, bearing friction measurement, and armature resistance measurement. Following the startup protocol the applied audio signal $V_{in}$ 82 is operated on by the microcomputer 81 to produce minimal distortion in the reproduced sound, and other signals are originated as necessary within the microcomputer 81 to manage and protect the rotary transducer assembly 21. In the present invention, the techniques used when reproducing sound, with the exception of centering as described hereinbelow, are considered to be forward corrections, estimations, or predictions based on accumulated historical data, as distinguished from negative feedback; during the startup protocol several processes utilize negative feedback of limited bandwidth—under 10 Hz.

Execution of the startup protocol can be lengthy, particularly if the fit of rotor assembly 58 to cylindrical enclosure 51 is close, minimizing air leakage, and the cabinet 26 is not vented to abbreviate pressure equalization. Since data collected during the startup protocol is reasonably stable and may be stored in computer memory, startup functions may be exercised selectively; intervals between executions of specific startup protocol functions may be scheduled or executed on command.

Figure 2B:
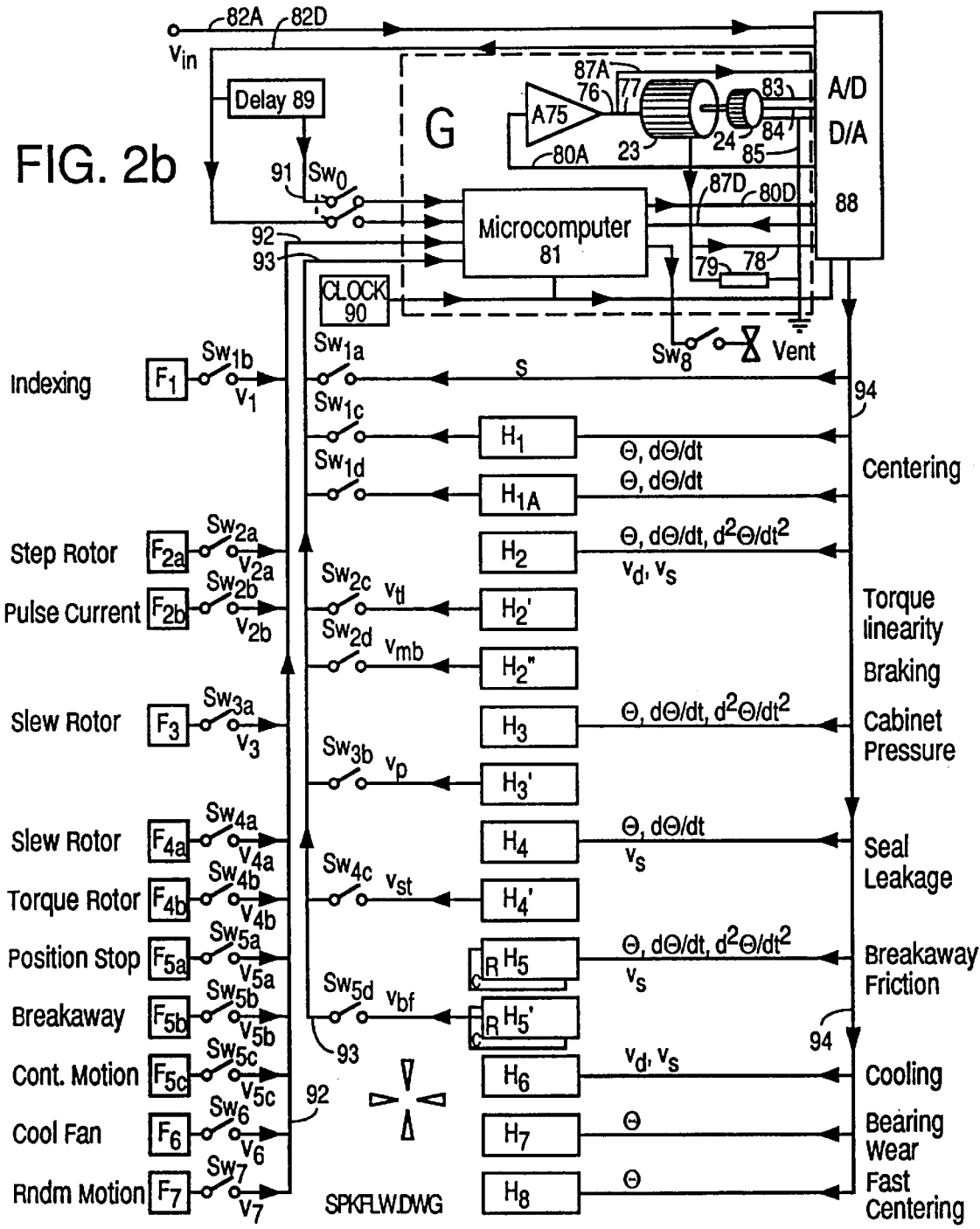
FIG. 2b is a block diagram of the rotary acoustic transducer apparatus control system.

FIG. 2b is a block diagram of the control system of FIG. 2a. Note that several of line numbers of FIG. 2a are duplicated in FIG. 2b (80, 82, 87) and suffixed with A or D, in each case indicating respectively analogue (A) or digital (D) form of the same signal. Digital data resolution is typically 14 or more bits. As noted above, in this FIG. 2b the A/D-D/A 88, and delay buffer 89 functions have been separated from the microcomputer per se for clarity of presentation and also as an illustration of a desirable implementation form in which data are collected, converted, and transmitted, most conveniently by direct memory access, to the microcomputer 81, at a typical data sample rate of 3000 samples/sec as determined by the clock 90. Delayed data from the delay buffer 89, use of which is described hereinbelow, enters the microcomputer through line 91.

FIG. 2b is in a block diagram form common to description of traditional analog control systems, though the implementation is largely digital. This form facilitates a simple function-by-function narrative description of a fairly complex control system. The arguments of time, frequency, period, or applicable transforms, of which there are several, and array subscripts, are not included in the FIG. 2b annotation in the interests of simplicity. The rotary acoustic radiator 22 and cabinet 26 are not shown in this FIG. 2b as they are well illustrated in several other Figures.

Fn is a function generator used in the startup protocol or in operational device management functions producing voltage-equivalent data signals entering the microcomputer 81 on line 92. G, enclosed in a dashed line, is the active control element in the controlled system, including the microcomputer 81, the power amplifier 75, the motor 23, and the position encoder 24. $H_n$ is a feedback or historical data return function. $H_n$ voltage-equivalent data signals are returned to the microcomputer on line 93. A primed function, e.g., $H_2'$ is a representation of computer-manipulated forward correction or estimation data derived from historical data stored in corresponding unprimed data return function, e.g., $H_2$ in microcomputer 81 memory. Corrective voltage-equivalent data signals, e.g., $V_{r1}$, are selected from the primed $H_n'$ tables. Switches $Sw_n$, are in common notation subscripted, where appropriate, to correspond to their respective $F_n$ functions. Note that with the exception of $H_1$ and $H_{1A}$ (with $S_{1c}$ or $S_{1d}$ closed, respectively) no direct negative feedback connection is shown.

All data return functions $H_n$ are shown for convenience as drawing data from a common bus 94, the specific data elements used in the $H_n$ function being shown adjacent to the line joining the right of each $H_n$ function to the data bus 94. Processed forward correction data from the $H_n'$ functions is indicated to the left of each $H_n'$ function.

Though the microcomputer 81 is shown as a separate element, it is to be understood that $F_n$, $V_n$, G, $H_n$, and $Sw_n$ functions are in practice included in the microcomputer 81 and executed by it.

In the following table the variables used in the control system are defined. The subsequent narrative describes, referring to FIG. 2b, the device initialization and operational control functions. Accompanying each such description is an example pseudocode computer program segment written in language like a contemporary enriched BASIC illustrating implementation of the control function algorithms. No attempt is made to reflect algorithm changes required by the interruptions and interactions that would obtain in an operating apparatus.

Control constants and variables. In the discussion of the preferred implementation hereinbelow the following constants and variables are known or derived as described from the rotary transducer assembly 21 described above.

C, the index or centered, neutral position of the rotor assembly 58, as set by rotational positioning of the position encoder 24 during apparatus fabrication.

S, rotor assembly 58 angular state relative to the index position C, clockwise (cw) or counterclockwise (ccw), indicated as a binary value.

Δt, the sampling period, typically 0.33 milliseconds, or a rate of 3000 samples/sec.

$t_B$, is bearing non-rotation or stop time.

$t_W$ is a waiting period

Ø, rotor assembly 58 angular position, measured from the index position C, typically calculated every sampling period Δt, with a resolution of ±10,000 counts. Positive values of—are ccw.

$d\emptyset/dt$, rotor assembly 58 angular velocity, typically derived as first differences of $\emptyset$, calculated every sampling period $\Delta t$.

$d^2\emptyset/dt^2$ rotor assembly 58 angular acceleration, typically derived as second differences of $\emptyset$, calculated every sampling period $\Delta t$.

$\Delta\emptyset$, rotor assembly 58 angular position step value, typically 5 or fewer degrees, used in the startup protocol to calibrate the rotary transducer assembly 21 and as the ordinate increment of the linearization table in microcomputer 81 memory, described hereinbelow.

$\pm\emptyset$max, are limit rotor positions, measured in either direction from the index position C, typically 60 degrees.

$\emptyset_s$ is the angular rotation prior to a stop.

$L_a$, armature inductance, typically 3 millihenrys $R_a$, torque motor 23 armature resistance, determined during apparatus fabrication or by microcomputer 81 driven test, typically 2 ohms.

$R_s$, armature current sampling resistor 79 resistance, determined during apparatus fabrication, typically 0.1 ohm.

$V_{in}$, the applied audio signal on line 82, typically 1 volt RMS maximum in analogue form.

$V_s$, the voltage across sampling resistor 79 $R_s$, measured on line 78

$V_d$, motor drive voltage, measured on line 77

$V_a$, motor armature voltage, $=V_d-V_s$.

$I_a$, motor armature current, $=V_s/R_s$ $V_a$ is a corrective voltage derived from historical data.

Control constants and variables (cont).

J, rotor assembly 58 moment of inertia (includes torque motor 23 armature moment of inertia), determined during apparatus fabrication, typically 0.0004 slug-ft$^2$.

T, torque motor 23 torque, typically 20 ft-lb maximum.

A, power amplifier voltage gain, typically 50.

r, radius to centroid of movable vanes 71 and 72, measured from the chamber axis 53.

$A_v$, Area of movable vanes projected on plane having chamber axis 53 as one edge $dT/dI_a$, torque motor 23 armature current sensitivity, a function of $\phi$ and Ia as the motor approaches saturation.

P, cabinet 26 internal pressure, also acting on rotor assembly 58.

V, cabinet 26 internal volume (includes connected volume of rotary acoustic radiator 22)

Centering—initialization. The position encoder 24 provides a rotor assembly 58 binary indexing signal on line 83 and position information on line 84. The indexing signal on line 83 indicates that the rotor assembly 58 is on one side or the other of the index (neutral, centered) position C. These indexing data and position data are periodically sampled by the microcomputer 81 at the nominal rate of 3000 samples per second.

During the centering function of the startup protocol the applied audio signal $V_{in}$ on line 82A, digitized in the A/D-DA converter 88 and returned to the microcomputer 81 on line 82D is suppressed by opening $Sw_0$. $Sw_{1c}$ and $Sw_{1d}$ are open. $Sw_{1a}$ is closed. The binary position S, cw or ccw, of the rotor assembly 58 relative to the index position C is determined by the value of the binary signal on line 83 and S on the digital data bus 94. A small voltage-equivalent signal $v_1$ is generated in the microcomputer 81 by $F_{1a}$ and $Sw_{1b}$ is closed. This small voltage exiting the microcomputer 81 on line 80D is converted to analogue in the A/D-D/A converter 88 and applied via line 80A to the power amplifier 75 having voltage gain A to rotate the rotor assembly 58 toward the index position C. When the binary value on lines 83 and 94 change state, angular-position-recording ($\emptyset$) registers in microcomputer 81 or external support circuitry are initialized and thereafter store the angular position $\emptyset$ of the rotor assembly 58 measured from the index position C, as measured in the immediately preceding sampling period. $Sw_{1a}$ is opened, disabling indexing state sampling S, $SW_{1b}$ is opened, disabling $F_1$ and $Sw_{1c}$ is closed, activating a low-bandwidth position feedback centering loop $H_1$.

Thereafter position data from position encoder 24 are returned to the microcomputer 81 via the A/D-D/A converter 88 and the digital data bus 94 and processed with appropriate gain adjustment and digital filtering in HI so that a negative feedback loop is created having a unity gain at 0.5 Hz with a slope of −20 db/decade. At about 2 Hz the gain slope is increased to −40 db/decade so that negative feedback and its attendant reduction of output is negligible in the audible range of 20 Hz and above. The centering process may be suspended by opening $Sw_{1c}$, have its bandwidth increased by closing Sw1d to invoke $H_{1A}$, or have its center position modulated by other apparatus management functions, as described hereinbelow.

$H_{1A}$, activated by opening $Sw_{1c}$ and closing $SW_{1d}$, is a feedback path having greater bandwidth used to abbreviate position settling during the startup protocol and for transient fast centering during high-output operation as described hereinbelow. Typical unity gain is at about 8 Hz with a local gain slope of −20 db/decade and gain slope increased to −40 db/decade at about 30 Hz. Typically this fast feedback loop from data bus 94 through $H_{1A}$ must damp the rotary-acoustic transducer 21 and cabinet 26 resonance, which occurs in the 3–6 Hz region, below loop unity-gain crossover.

Centering—operation. In normal operation $Sw_0$ and $Sw_{1C}$ are closed, applied audio signal Vin on line 82A is digitized and amplified and delivered to the torque motor 23 as described above while the low-bandwidth centering feedback system through $H_1$ and $Sw_{1C}$ continues to operate with negligible effect on reproduced sound.

Example pseudocode centering algorithms are:

Initialization:

| | |
|---|---|
| $Sw_0, Sw_{1c}, Sw_{1d} = 0$ | ;disable input, feedback |
| $Sw_{1b} = 1$ | ;return indexing |
| If $S \neq C$ | ;rotor not centered |
| $Sw_{1b} = 1$ | ;enable centering |
| $F1 = (-1)*v1*(sgn(S))$ | ;move to center |
| Else $\emptyset = 0$ | ;clear $\emptyset$ register |
| $Sw_{1a}, Sw_{1b} = 0$ | ;quit centering |
| $Sw_0, Sw_{1c} = 1$ | ;centered operation |
| | ; $H_1$ active |

Operation:

| | |
|---|---|
| $Sw_{1a}, Sw_{1b} = 0$ | ;indexing position not sensed |
| $Sw_0, Sw_{1c} = 1$ | ;centered operation, |
| | ;$H_1$ active |

Torque motor linearization—initialization. It is not economically convenient to produce an uncommutated torque motor 23 with linear armature deflections of the 1 to 2 radians needed for a rotary acoustic radiator assembly 21. Uncommutated torque motor 23 torque-to-armature-current sensitivity dT/dI, usually decreases at large angular deflections Ø and armature currents $I_a$ and is a potential source of predominantly odd-order harmonic distortion. These non-linearities must be measured and corrected.

During the startup protocol applied audio signal on line 82D is suppressed by opening $Sw_0$ and the torque motor 23 is stepped through its operational range of rotation Ø in increments of a few degrees ΔØ by a sequence of corresponding voltages $V_{2a}$ originated at $F_{2a}$ in the microcomputer 81. $SW_{1d}$ is open, disabling fast feedback. $SW_{1c}$ is closed so negative feedback is used to assure correct angular positioning of the rotor assembly 58 at each angular step. The rotor assembly 58 is retained at the desired angular step position Ø by the feedback until the torque T required to position it is substantially zero, as indicated by armature current $I_a$=0, measured as $V_a$=0 on line 78. In general the required time to achieve zero torque T is established by air leakage around the rotor assembly 58 which extinguishes the pressure difference between cabinet and user sides of the rotary acoustic transducer 22. Typically several seconds are needed for this pressure-difference decay. An electrically-operated vent controlled by microcomputer 81 via $Sw_8$, venting the cabinet 26 interior to outside air, may be used to accelerate the pressure-difference decay.

At each rotor assembly 58 angular step Ø, when the pressure difference has decayed ($I_a$ or $V_s$=0), the signal $v_{2a}$ from $F_{2a}$ is suppressed by opening $SW_{2a}$, the position negative feedback is suppressed ($Sw_{1c}$, $Sw_{1d}$ open) by the microcomputer 81, $SW_{2b}$ is closed and a voltage pulse $v_{2b}$ from $F_{2b}$ is converted to a known pulse of armature current $I_a$ by the power amplifier 75 and applied to the armature of the torque motor 23. This pulse produces an angular acceleration $d^2Ø/dt^2$ of the armature and rotor assembly 58, which is detected by the position encoder 24 and microcomputer 81 as an initial movement, and is a measure of torque motor 23 torque-to-armature-current $dT/dI_a$ sensitivity at the measured angular position Ø and armature current $I_a$. The armature current pulses are brief —about 2 milliseconds—so that resulting rotor assembly 58 angular deflection is small and significant cabinet 26 pressure differences do not develop across the rotor assembly 58 during the pulse. With large armature current $I_a$ pulses, small pressure differences do indeed develop across the rotor assembly 58 due to rotor assembly 58 rotation, and small torque corrections derived from transducer and cabinet combined-volume changes must be included in the $dT/dI_a$ sensitivity calculation (not shown).

Immediately following the pulse $Sw_{1c}$ is closed to damp the rotor assembly 58 movement and return the rotor to its position at the start of the pulse. More rapid damping may be effected by using feedback return through $H_{1A}$ and $Sw_{1d}$.

This measurement sequence of rotor assembly 58 angular positioning, pulsing, and damping is repeated each angular position Ø step at increasing levels of armature current $I_a$ until sensitivity decreases, for example 30 percent, to calibrate motor behavior at normal operating levels, when approaching saturation, and when approaching limits of usable rotation ±Ømax. The rotational moment of inertia of the rotor assembly 58 J is determined during apparatus fabrication and is used by the microcomputer 81 to calculate torque T at each point in this process from angular acceleration T=J·$d^2Ø/dt^2$. These data, including the sensed maximum (saturation) rotational accelerations $d^2Ø/dt^2$ and the armature currents $I_a$ required to produce them, are stored in memory of the microcomputer 81 in an array $H_2(Ø,I_a)$ organized by angular position Ø in steps of ΔØ as rows and armature current $I_a$ as columns. $H_2(Ø,I_a)$ is organized in much the same way as functions ($H_2$-$H_4$) described hereinbelow. The torque sensitivity values entered in each cell in $H_2(Ø,I_a)$ form a "map" of torque motor 23 torque-to-armature-current sensitivity dT/dIa at each point in its rotational position Ø and armature current $I_a$ range which account substantially completely for design structure, variations in materials and manufacture, and aging of the field magnets. This torque sensitivity map is normalized to produce a table of corrections $V_{t1}$ =$H_2'(Ø,V_{in})$ to be added to the applied audio signal $V_{in}$ 82A so that the transfer function during sound reproduction from the applied audio signal $V_{in}$ 82A to torque motor 23 torque T is linear.

Torque motor linearization—operation. In operation, $Sw_{1d}$, $SW_{2a}$ and $SW_{2b}$ are open. At each sample period Δt the applied audio signal $V_{in}$ 82 and rotor assembly 58 position Ø from the encoder 24 are read, stored normalization values looked up in $H_2'(Ø,V_{in})$ in the linearization table, interpolation of stored normalization 5values performed if necessary, the applied audio signal $V_{in}$ 82 modified by addition of correcting signals vtl derived from $H_2'(Ø,V_{in})$ in microcomputer 81, converted back to analog form by the A/D-D/A converter 88, and fed to in e 80A.

This motor linearization technique may be applied to multipole commutated motors to compensate motor magnetic circuit nonlinearities (pole geometry, ferromagnetic saturation) provided the commutation is positionally consistent, as, for example when controlled by a digital position encoder. ΔØ increments in the $H_2(Ø,I_a)$ and $H_2'(Ø, V_{in})$ tables, in this case, would be very small.

Example pseudocode initial torque linearizing algorithms are:

Initialization:

| | |
|---|---|
| $Sw_0, Sw_{1d} = 0$ | ;no input |
| $Sw_{1c}, Sw_{2a} = 1$ | ;enable $H_1, F_{2a}$ |
| For Ø = −Ømax to +Ømax step ΔØ | ;derived from $v_{2a}$ |
| For Ia = 0 to $I_a$max step Δ$I_a$ | ;derived from $v_{2b}$ |
| If $V_s \neq 0$ and $dØ/dt \neq 0$ | ;settled? |
| $Sw_{1c} = 1$ | ;position feedback |
| $F_{2a} = v_{2a}*Ø$ | ;set position |
| Else $Sw_{2a}, Sw_{1c} = 0$ | ;feedback, $v_{2a}$ off |
| $Sw_{2b} = 1$ | ;pulse enabled |
| $T, I_a(t) = 0$ | ;initialize |
| $F_{2b} = v_{2b}(I_a, t)$ | ;a 6*Δt pulse |
| For $t = t_0$ to $(t_0 + 6*Δt)$ step Δt | |
| $ΔI_a = (I_a(t) − I_a(t − 1))$ | :Ia change |
| $I_a = (I_a(t) + I_a(t − 1))/2$ | ;avg Ia in Δt |
| $d^2Ø/dt^2 = (dØ/dt)*Δt$ | ;1 period accel. |

-continued $T1 = J*d^2\emptyset/dt^2$ $\Delta T = T1 - T$   ;change in $\Delta t$ $H_2(\emptyset, I_a) = \Delta T/\Delta I_a(\emptyset, I_a)$   ;local torque ;sensitivity $T = T1$ Next $t$ $Sw_{2b} = 0$   ;end pulse Next $I_a$ Next $\emptyset$ $Sw_{1c} = 1\ Sw_{2a}, Sw_{2b} = 0$   ;center rotor For $\emptyset = -\emptyset$max to $+\emptyset$max step $\Delta\emptyset$   ;normalize gains –

For $I_a = 0$ to $I_a$max step $\Delta I_a$ $H_{2'}(\emptyset, I_a) = \Delta T/\Delta\emptyset(\emptyset_0, I_{a0})/T(\emptyset, I_a)$ ;to low deflections $H_2'(\emptyset, V_{in}) = H_2(\emptyset, I_a)/(K*R_a)$   ;local voltage ;sensitivity ;the reference $\Delta T/\Delta\emptyset(\emptyset_0, 1_{a0})\ I_{ao}$ is average of 25 $H_2(\emptyset, I_a)$ cell contents centered about $\emptyset = 0, I_a = 0$ Operation:

$$v_{11} = (V_{in}(t) - V_{in}(t-1))*H_2'(\emptyset, V_{in})$$

Movable vane damage protection—braking table creation. To produce a desired working bandwidth upper frequency of 80 Hz, motor maximum torque T is high and the rotor assembly 58 structure is very light, with a low rotational moment of inertia J. The potential for damage if movable vanes 71 and 72 collide with stationary vanes 62 and 63 is serious. In configurations where the vanes are plane, e.g., FIGS. 2a and 3, the port angular width provides a safety margin for vane overtravel beyond ±Ømax, as vanes are not ordinarily driven beyond port boundaries. In the more efficient commercial configurations where vanes are likely to have bent, twisted, or stepped configurations, and user- and cabinet-side ports overlap in the same angular sector about the chamber axis 53, as described hereinbelow, e.g., FIG. 4, rotor assembly 58 and movable vane 71 and 72 overtravel safety margins may vanish.

As part of the startup protocol a braking table is created which stores for each rotor assembly 58 angular position Ø the maximum velocity which can be dissipated by the torque motor 23. $Sw_0$ and $SW_{1d}$ are open, $Sw_{1c}$ is closed, centering the rotor assembly 58. The torque-to-armature-current sensitivity data $dT/dI_a$ in $H_2(\emptyset, I_a)$ derived as described hereinabove are processed using the maximum (motor saturation) accelerations recorded at each measured rotational point Ø. These are tabulated starting at the limits of rotational position ±Ømax and working toward the index position C. From these tabulated maximum accelerations the maximum angular velocity dØ/dt at any rotational point Ø which may be dissipated or decelerated to a stop at the limit of rotor assembly 58 travel ±Ømax may be calculated by numerical integration at each step $\Delta\emptyset$ of increments $\Delta d\emptyset/dt = (2d^2\emptyset/dt^2 \cdot \Delta\emptyset)^{0.5}$ for each angular position Ø from ±Ømax to C and stored as a column in the braking table $H_2"(\emptyset,1)$. The maximum braking signal $V_{mb}$ on line 93 for the power amplifier 75 to produce this deceleration is also calculated the power a gain A of the power amplifier 75, and entered as another column $H_2"(\emptyset,2)$ in the braking table.

Movable vane damage protection—braking operation. At each sample period $\Delta t$ sensed rotor assembly 58 angular velocity dØ/dt is compared with limit dØ/dt values stored at $H_2"(\emptyset,1)$ as a function of Ø in the braking tables by the microcomputer 81. If rotor assembly 58 angular velocity dØ/dt is excessive, that is, if it is above, for example, 85 percent of the maximum angular velocity dØ/dt for a given Ø which may be dissipated safely before the limit of rotor assembly 58 travel ±Ømax is reached, the applied audio signal $V_{in}$ 82 is suppressed by opening $Sw_0$, $SW_{2d}$ is closed, and the appropriate decelerating signal $V_{mb}$ read from table $H_2"(\emptyset,2)$ by microcomputer 81 to provide the torque T to brake or stop the rotor assembly 58 and movable vanes 71 and 72 before contact with stationary vanes 62 and 63 can occur. The process is continued at each sample period until dØ/dt is less than the $H_2"(\emptyset,1)$ limit as f (Ø), at which time $Sw_0$ is closed and $Sw_{2d}$ opened to resume normal operation.

Example pseudocode movable vane protection algorithms are

Initialization:

$Sw_0, Sw_{1d} = 0; Sw_{1c} = 1$   ;centered, no input $H_2"(\emptyset, 1) = SQRT\ (2*d^2\emptyset/dt^2(-\emptyset\ max)*\Delta\emptyset)$ ;accel at –Ømax For $\emptyset = (-\emptyset$max $+ \Delta\emptyset)$ to 0 step $\Delta\emptyset$   ;cw, end to center $H_2"(\emptyset, 1) = H_2"(\emptyset - \Delta\emptyset, 1) +$   ;prior sum $SQRT\ (2*d^2\emptyset/dt^2(\emptyset)*\Delta\emptyset)$   ;numerical integration Next Ø

$H_2"(\emptyset, 1) = SQRT\ (2*d^2\emptyset/dt^2(\emptyset\ max)*\Delta\emptyset)$ ;accel at Ømax For $\emptyset = (\emptyset$max $- \Delta\emptyset)$ to 0 step $-\Delta\emptyset$   ;ccw, end to center $H_2"(\emptyset, 1) = H_2"(\emptyset + \Delta\emptyset, 1) +$   ;prior sum $SQRT\ (2*d^2\emptyset/dt^2(\emptyset)*\Delta\emptyset)$   ;numerical integration Next Ø

For $\emptyset = -\emptyset$max to Ømax step $\Delta\emptyset$ $V_{mb} = H_2"(\emptyset, 1)*I_a*R_a/(T*K)$   ;braking voltage $H_2"(\emptyset, 2) = v_{mb}$   ;store it Operation:

If $0.85*H_2"(\emptyset, 1) < d\emptyset/dt$   ;speed too high ?

$Sw_0 = 0\ Sw_{2d} = 1$   ;no input, brake $v_{mb} = H_2"(\emptyset, 2)$   ;decelerate with $I_a$max Cabinet volume correction—initialization. In an economical domestic-use design, the volume displaced by the rotary acoustic radiator 22 is a significant fraction of the volume of the supporting cabinet 26 (typically 5–30%). At low frequencies air compliance within the cabinet 26 provides the primary force resisting motor torque (inertial forces dominate at high frequencies).

With changing angular position Ø of rotor assembly 58, combined rotary acoustic radiator assembly 22 and cabinet 26 air volume compliance changes. This nonlinear compliance is a source of intermodulation and even-order harmonic distortion of sound output at high levels; it is statically hyperbolic and dynamically adiabatic. Prudent use of acoustic damping materials within the cabinet 26 can render the dynamic behavior substantially isothermal (hyperbolic). This compliance must be defined for all positions Ø of the rotor assembly 58.

As part of the startup protocol Swo is opened. $Sw_{1d}$ is closed, providing fast position negative feedback centering the rotor assembly 58. $SW_{3a}$ is closed and the rotor assembly 58 is slewed through a series of large angular deflections Ø by voltages $V_3$ generated at $F_3$ in microcomputer 81. Preferably these voltages are ramps of about 0.1 sec duration terminating in plateaus rather than voltage steps in order to limit percussive sound output during this part of the startup protocol. Resulting angular positions Ø are measured with the position encoder 24. The feedback loop is permitted to settle ($dV_s/dt$ and $d^2Ø/dt^2$ less than some small constant)— $V_s$ value is not steady because the feedback loop will be compensating intracabinet pressure changes due to leakage around the rotor assembly 58 and the absolute value of armature current $I_a$ and $V_s$ will be changing slowly.

The armature current I, required to hold these step positions is converted to torque T using the torque-to-armature-current sensitivities stored at $H_2(Ø,I_a)$ in the torque linearization table, and thence to intracabinet pressure P=T/ (r★$A_v$). These data points, together with the known (from apparatus fabrication) rotary acoustic radiator 22 displacement volume as a function of angular rotation Ø of the rotor assembly 58, dV=r★$A_v$★dØ, are used by the microcomputer 81 to calculate the combined volume V of cabinet 26 and the connected volume of rotary acoustic radiator 22 as a function of rotor assembly 58 angular position Ø, fitting a curve of the form $P_1V_1^y=P_2V_2^y$ via least-squares or similar technique. Values at the measured points are stored, along with the measured intracabinet pressure P in two columns of a PV table at $H_3(Ø,1)$ and $H_3(Ø,2)$. P and V values as f(Ø) not represented in the data points are read from the fitted P and V curves and entered into the empty cells in $H_3(Ø,1)$ and $H_3(Ø,2)$. Finally, the driving signal corrections $V_p$ necessary to provide pressure-compensating torque T are calculated for each Ø and stored in the PV table at $H_3'(Ø)$. $Sw_0$ is closed, $Sw_{1c}$ and $Sw_{3a}$ are opened.

Cabinet volume correction—operation. During sound reproduction, $Sw_0$ is closed, $SW_{3b}$ is closed, and angular position data Ø is used as the argument to fetch driving signal $V_p$ corrections $V_p$ from $H_3'(Ø)$ to adjust motor torque T for the varying air pressure of the cabinet 26 and the connected volume of rotary acoustic radiator 22, producing a more linear response of the rotor assembly 58 to the applied audio signal $V_{in}$ 82.

Example pseudocode cabinet volume correction algorithm is:

Initialization:

| | |
|---|---|
| $Sw_0, Sw_8 = 0$  $Sw_{1d}, Sw_{3a} = 1$ | ;No input, fast feedback |
| For Ø = (−0.8)\*Ømax to (0.8)\*Ømax step Ømax/5 | |
| | ;slew rotor position |
| For $t$ = 0 to 300 | ;0.1 second |
| $F_3 = v_3$ | ;ramp position |
| Next $t$ | |
| While $dVs/dt > k_3$ and $d2Ø/dt2 > 0$ | |
| | ;settled? $k_3$ is small wait |
| Else $P = I_a*(H_2(Ø,Ia))/(A_v*r)$ | ;calc pressure |
| $H_3(Ø,1) = P$ | ;and store |
| $F_3 = 0$ | ;recenter rotor |
| $Sw_8 = 1$ | ;vent cabinet |
| While $Vs > 0$ and $d^2Ø/dt^2 > 0$ | |
| wait | ;settle with $P = 0$ |
| $Sw_8 = 0$ | ;close vent |
| Next Ø $Sw_{3a} = 0$ | |

Fit $P$ curve to points.
Fill remaining cells in $P$ curve and $V$ curve in $H_3(Ø, 1)$ and $H_3(Ø, 2)$ from −Ømax to Ø max.

$v_p = I_a*(H_2(Ø, I_a))/(A*A_v*r)$ $H_3'(Ø) = v_p$

Operation:

$Sw_0, Sw_{3b} = 0$ $v_p = H_3'(Ø)$

A pressure-volume correction calculation similar to the above may be performed if the cabinet is included during apparatus fabrication, but the effective displaced intracabinet volume and damping characteristics of acoustically absorptive materials are not usually well controlled during manufacture and tend to change with time. The startup protocol calculation described above will calculate and maintain accurate PV corrections, even if not isothermal, over an extended range of intracabinet volumes and apparatus life. It confers great latitude in apparatus placement, as in residential built-in and vehicle aftermarket installations, as the enclosure characteristics are determined automatically after installation.

Seal leakage correction—initialization. Reasonably effective seals are achieved by the very close approximation of surfaces about the margins of rotor assembly 58 but air will leak. Leakage in the rotary acoustic radiator assembly 22 varies as a function of internal geometry resulting from manufacturing tolerances, e.g., eccentricity of the axis of the rotor assembly 58 within the enclosing cylinder sidewall 52 or eccentricity of the cylinder sidewall 52 itself, as might be expected from an aging composite cylinder sidewall 52. This leakage is most significant at low frequencies as the effective excursion of the rotor assembly 58 is reduced by the leakage (requiring that rotor assembly 58 excursion be increased). Seal leakage is a source of distortion which would not be corrected by position- or velocity-derived negative feedback, if used.

As part of the startup protocol $Sw_0$ is open, $Sw_{1c}$ and $Sw_{4a}$ are closed, the rotor assembly 58 positioned at one limit of its rotation ±Ømax by a voltage $V_{4a}$ from $F_{4a}$. $SW_{1c}$ and $Sw_{4a}$ are opened, $Sw_{4b}$ is closed. The rotor assembly 58 is then rotated slowly through its angular range, sweeping from one Ømax limit to the other in such a way that the vane torque is in equilibrium with cabinet pressure as the rotor assembly 58 passes Ø=0, by a microcomputer-originated constant torque T, measured as a voltage drop $V_s$ on sampling resistor 79, derived from a constant voltage $v_{4b}$ at $F_{4b}$ and adjusted by armature-current-to-torque corrections stored at $H_2'(Ø,V_{in})$ in the torque linearization table, which constant torque T corresponds in turn to a constant level of intracabinet pressure P. Rotor assembly 58 angular velocity dØ/dt is converted to a leakage rate dV/dt = r · $A_v$ · dØ/dt and recorded as a seal leakage table at $H_4$ (Ø,T) in memory of microcomputer 81. This process may be repeated for several levels of torque T, hence several levels of intracabinet pressure P, and stored in columns $H_4$ (Ø,T) in the seal leakage table. These seal leakage rates are further converted into torque correction signals $V_{s1}$ as functions of Ø and P and stored in columns at $H_4'(\emptyset,T)$ in the seal leakage table. $Sw_0$ is closed. $Sw_{4b}$ is opened.

Seal leakage correction—operation. $SW_{3b}$ and $SW_{4c}$ are closed. Cabinet pressure P is estimated from rotor assembly 58 angular position $\emptyset$ as recorded in $H_3(\emptyset,1)$, seal leakage torque correction signals $V_{s1}$ are fetched from the seal leakage torque table in microcomputer 81 memory at $H_4'(\emptyset)$ and interpolated between table-stored $H_4'(\emptyset)$ values if necessary. Motor torque T is corrected to increase rotor assembly 58 angular velocity $d\emptyset/dt$ to compensate for the estimated leakage rate by adding to the correcting signal $V_{s1}$ the applied audio signal $V_{in}$ 82.

Example pseudocode seal leakage correction algorithms are:

Initialization:

| | |
|---|---|
| $Sw_0 = 0\ Sw_{2c}, Sw_{4a} = 1$ | ;enable sweep, torque correction |
| For $v_{4a} = 0$ to 1 step .25 | ;cw sweep |
| $Sw_{1d}, Sw_8 = 1$ | ;fast feedback, vent open |
| $v_{4a} = F_{4a}$ | ;position to ccw limit |
| If $d\emptyset/dt > 0$ or $d^2\emptyset/dt^2 > 0$ | ;settled? |
| wait | |
| Else $Sw_{1d} = 0$ | ;no feedback |
| $Sw_8 = 1$ | ;close vent |
| $T = v_{4b}*A*T/I_a(\emptyset, I_a)$ | ;apply torque |
| $P = T*A_v*r$ | ;to produce pressure |
| If $dV_a/dt \neq 0$ | ;await steady state |
| wait | ;while accelerating |
| Else $dV/dt = A_v*r*d\emptyset/dt$ | ;leakage rate |
| $H_4(\emptyset, T) = dV/dt$ | ;store leakage rate |
| Next $v_{4a}$ | |
| ;Repeat code with $-\emptyset$max | ;ccw sweep |
| ;Interpolate between pressure values and store in $H4(\emptyset, T)$ from $-\emptyset$max to $\emptyset$max. | |
| $v_{s1} = H_2(\emptyset, I_a)/A*H_3(\emptyset, 1)*A_v*r$ | ;pressure-equivalent torque |
| $H_4'(\emptyset) = v_{s1}$ | ;T from corrected $I_a$ |
| $Sw_0, Sw_{1c} = 1\ Sw_{2b}, Sw_{4a}, Sw_8 = 0$ | |

Operation:

| | |
|---|---|
| $Sw_{4c} = 1$ | ;leakage data on |
| $v_{s1} = H_4'(\emptyset)$ | ;leakage correction for cabinet pressure |

Bearing breakaway friction—initialization. Antifriction bearings have very low static or breakaway (from stop) friction if operated with light oil and without shields or seals. So operated they would be short-lived in the subject user environment, as user-environment air is dusty and pressure gradients can appear across the bearings. Grease lubrication and shields or seals are regarded as necessary, but they may increase breakaway friction more than an order of magnitude. While bearings are stopped, this breakaway (static) friction is present and overall gain through the rotary acoustic transducer apparatus 21 is zero. The consequent dead zone or hysteresis is a significant source of distortion at low power (30–50 db below maximum) output. The phenomenon is most serious when grease-lubricated ball bearings are stopped for more than an instant, as the grease, pulled by capillary forces, tends to cup around the balls. On first movement away from the stopped position these cups must be penetrated by the balls, with resultant increased breakaway torque needed to overcome the breakaway friction. Roller and needle bearings have similar properties.

As part of the startup protocol of this invention, these frictions are measured. $Sw_0$ is opened, $Sw_8$ is closed, venting the cabinet so that cabinet pressure P does not apply a torque T to the vanes, and a programmed series of small signals is generated from a table of angular rotations (rows) and stop durations (columns) stored at $F_{5a}$ in microcomputer 81. Typically the range of rotations is from 0 to (360 degrees /(the number of balls in the bearings)), and the stop durations range from 0 to 50 milliseconds, typically in increments of 5 milliseconds. $SW_{1d}$ is closed, invoking the fast position negative feedback. $Sw_{5a}$ is closed, accessing data at $F_{5a}$. A signal $V_{5a}$ read from $F_{5a}$ moves the rotor assembly 58 and bearings a known angular distance $\emptyset$. When they are brought to rest, as determined by $V_s=0$ or armature current $I_a=0$ and $dV_s/dt=0$ or $dI_a/dt=0$, $SW_{1d}$ is opened, interrupting the fast position negative feedback. A stop-duration period is read from the table in $F_{5a}$; no signal is applied to the torque motor 23 during this period.

At the end of the stop-duration period, a breakaway-duration counter $t_s$ in microcomputer 81 operating at the sampling rate $\Delta t$ is cleared and started, counting each sample period. $SW_{5a}$ is opened and $SW_{5b}$ is closed. A small ramp voltage-equivalent signal is generated in $F_{5b}$ having a sign such that rotor assembly 58 will either reverse or continue its direction of rotation relative to that preceding the peak or plateau, which voltage-equivalent signal results in a small increasing torque T in the torque motor 23. When the bearing moves, indicated by incrementing of the position encoder 24, the breakaway-duration counter is stopped and breakaway torque read as the armature current $I_a=V_s/R_s$ through sampling resistor 79 at the moment of breakaway and stored in memory of the microcomputer 81 in two breakaway-friction tables at $H_5(\emptyset_s,t_s)$, one each for breakaway rotations which are continuations and those for reversals of the immediately prior rotation, each table organized by extent of prior angular rotation of the rotor assembly 58 prior to stop $\emptyset s$ and duration of stop $t_s$. The values of $\emptyset s$ and $t_s$ are rounded to integers to be used as subscripts and the torque stored in the appropriate $H_5(\emptyset_s,t_s)$. This process is repeated until the desired range of prior rotation and stop duration has been tested. Because of the relatively coarse granularity of sampling period and rotation measurement, tests at each point may be repeated and the results combined statistically. During the breakaway measurement process the system sampling rate may be increased to improve the resolution of the breakaway friction tables.

Data in $H_5(\emptyset_s,t_s)$ are converted into voltage increments $V_{bf}$ which will produce the desired breakaway torques and these voltage increments are stored in two tables $H_5'(\emptyset_s,t_s)$, organized as to correspond with $H_5(\emptyset_s,t_s)$. $Sw_8$ and $Sw_0$ are closed, $Sw_{1d}$ and $Sw_{5b}$ are opened.

If prior velocity of rotation proves relevant for a given bearing structure, seal structure, or lubricant, the friction-measuring process and the breakaway friction tables $H_5(\emptyset_s, t_s)$ and $H_5'(\emptyset_s,t_s)$ may be extended to include velocity data as a third dimension.

Typically during the mapping of breakaway friction the greater bandwidth of the fast position negative feedback function $H_{1A}$ is used to reduce rotary vane assembly 58 settling time. This closed-loop positioning system should be overdamped so that the bearings approach their stopped positions monotonically or the overtravel of bearing balls in the races will create channels in the lubricant beyond the stop position which would invalidate breakaway-friction measurements for plateaus in rotor assembly 58 motion.

Bearing breakaway friction—operation. $Sw_0$, $Sw_{5c}$ are closed. When the applied audio signal $V_{in}$ 82 approaches a stop (indicated by small $d\emptyset/dt$ and opposing $d^2\emptyset/dt^2$) and rotation reversal or continuation at local waveform peaks or plateaus, the values of two immediate-history registers (three if velocity history is stored) in microcomputer 81 memory, retaining angular extent of rotation $\emptyset_s$ prior to stop, measured from the last stop, and the duration of stop $t_s$ are updated. When the applied audio signal $V_{in}$ 82A requires resumption of rotor assembly 58 bearing motion as indicated by $dVs/dt \neq 0$ the previously recorded immediate-history registers are read to provide the arguments $\emptyset_s$ and $t_s$ as subscripts to access the breakaway-friction tables which are read from $H_5'(\emptyset_s, t_s)$ in microcomputer 81 memory and $V_{bf}$ added to the applied audio signal $V_{in}$ 82D to produce a momentary (one sample period duration) armature current pulse Ia which substantially reduces or overcomes bearing breakaway friction, minimizes hysteresis and dead zone, and reduces output distortion.

Breakaway torques are reproducible, influenced by temperature as well as by extent (and sometimes velocity) of rotation immediately preceding a stop, and by duration of the stop. After the startup protocol, breakaway torques are recorded selectively during sound reproduction at the moment of breakaway and recorded in the breakaway friction table $H_5(\emptyset_s, t_s)$ of the microcomputer 81 as function of the prior extent of rotation $\emptyset_s$ and duration of stop $t_s$, and also held in the immediate-history registers described hereinabove. As described hereinabove these parameters, suitably rounded to serve as subscripts, are used to store data in $H_5(\emptyset_s, t_s)$ as well as fetch it from $H_5'(\emptyset_s, t_s)$. In operation two additional immediate-history registers store armature current $I_a$ and rotor assembly 58 angular position $\emptyset$ at the moment of rotor assembly 58 stop. New data are updated in $H_5(\emptyset_s, t_s)$ only if armature current $I_a$ and rotor assembly 58 angular position $\emptyset$ are small, typically 5 percent of $I_a$ maximum and $\emptyset$ maximum, respectively, implying small confounding drive and intracabinet pressure torques which must nevertheless be subtracted respectively from breakaway-friction torque values to be entered in $H_5(\emptyset_s, t_s)$. Breakaway-friction table values in $H_5'(\emptyset_s, t_s)$ are updated from data in $H_5(\emptyset_s, t_s)$ as simple moving averages calculated over (say) 50 events having the same immediate-history register prior rotation $\emptyset_5$ and stop duration $t_s$ values, thus reflecting bearing breakaway friction changes. The event count must be recorded as additional data for $H_5(\emptyset_s, t_s)$ cells, most conveniently in a similar array, to assure that the accumulated data are statistically valid prior to updating working $H_5'(\emptyset_s, t_s)$ table data. Updated breakaway friction tables are used as described above.

As an alternative or adjunct to the breakaway friction management described above, to limit breakaway friction buildup during rotor assembly 58 bearing stops described above, the normal stop-pause-start rotor assembly 58 sequence at waveform peaks and plateaus of the applied audio signal $V_{in}$ 82A is forestalled by not permitting the bearing rotation to pause. When the applied audio signal $V_{in}$ 82A would cause the bearings to pause, detected by microcomputer 81 as a low angular velocity $d\emptyset/dt$ and opposing $d^2\emptyset/dt^2$, the microcomputer 81 closes $Sw_{5c}$ and generates a infrasonic voltage input $V_{5c}$ at $F_{5c}$ sufficient to cause the rotor assembly 58 and the bearings to continue to move slowly, limiting grease-cup formation in the bearing races. This infrasonic voltage from $F_{5c}$ is reversed from time to time to limit accumulation of rotor assembly 58 angular displacement $\emptyset$ from this source to a few degrees. A breakaway-reducing torque derived from $H_5'(\emptyset_s, t_s)$ may be used to assist this rotation reversal. When applied audio signal-generated movement is resumed, indicated as a $d\emptyset/dt$ other than that produced by $F_{5c}$, $Sw_{5c}$ is opened and the infrasonic input at $F_{5c}$ suppressed. Thus the bearings either accelerate from an already-moving state or reverse instantaneously. In the first case static or breakaway friction is nearly eliminated. In the second case it is stabilized and minimized. The slow movement decreases available apparatus volumetric efficiency, but the decrease may be substantially recovered as described hereinbelow.

Example pseudocode breakaway friction algorithms are:

Initialization – for rotation reversals:

$Sw_0, Sw_8 = 0, Sw_{5a} = 1$

For $\emptyset = 0$ to (360/*#balls) step 360/10*#balls)

| | |
|---|---|
| For $t = 0$ to 50 step 5 | ;milliseconds |
| $Sw_{1d}, Sw_{5a} = 1$ | ;fast positioning |
| $F_{5a} = v_{5a}(\emptyset)$ | ;set rotation |
| While $Vs \neq 0$ and $dVs/dt \neq 0$ | ;settled at $\emptyset$? |
| wait | |
| Else $Sw_{1d} = 0$ | ;no feedback |
| For $t_s = 0$ to $t$ step $\Delta t$ | ;wait stop period |
| wait | |
| Next $t_s$ | |
| $t_b = 0$ | ;*init* breakaway |
| $Sw_{5b} = 1$ | ;enable ramp |
| While $d\emptyset/dt = 0$ | ;no motion |
| $F_{5b} = v_{5b}*\Delta t$ | ;generate torque ramp |
| $t_b = t_b + \Delta t$ | |
| else $I_a = F_{5b}*A/R_a$ | ;rotor moved |
| $T = I_a*T/I_a(\emptyset, I_a)$ | ;from $H2(\emptyset, Ia)$ |
| else $H_5(\emptyset_s, t_s) = T$ | |
| $v_{bf} = v_{5b}*\Delta t$ | $H_5'(\emptyset_s, t_s) = v_{bf}$ |
| Next $t$ | |
| Next $\emptyset$ | |
| $Sw_{1c}, Sw_8 = 1 \; Sw_{5b} = 0$ | ;normal operation |

;repeat code for rotation continuations, reversing

;sign of $v_{5b}$

Operation:

| | |
|---|---|
| $Sw_0, Sw_{5c} = 1$ | |
| $t_s, \emptyset_s = 0$ | ;initialize stop registers |

If $d\emptyset/dt < k_{5c}$ and $sgn \, (d^2\emptyset/dt^2) \neq sgn \, d\emptyset/dt$ -continued

| | |
|---|---|
| $\emptyset_s = \emptyset_s + \emptyset(t) - \emptyset(t-1)$ | ;approaching stop? ;accum $\emptyset_s$ |
| Else $\emptyset_s = 0$ | ;reset $\emptyset_s$ |
| If $d\emptyset/dt = 0$ and $d^2\emptyset/dt^2 = 0$ | ;stopped |
| $t_s = t_s + \Delta t$ | ;stop duration |
| $I_{as} = I_a$ | ;save $I_a$ |
| $\emptyset_r = \emptyset$ | ;where stopped |
| If $d\emptyset/dt \ne 0$ and $\|I_{as}\| < 0.05 \|I_a\text{max}\|$ and | |
| $\|\emptyset_r\| < 0.05 \emptyset\text{max}$ | ;stopped in linear region? |
| $v_{bf} = H_5'(\emptyset_s, t_s)$ | ;select $H_5'$ with ;$sgn(d\emptyset_s/dt)$ |
| call subroutine Update ($\emptyset_r, I_a, \emptyset_s, t_s$) | |
| Else $v_{bf} = H_5'(\emptyset_s, t_s)$ | ;select $H_5'$ with ;$sgn(d\emptyset_s/dt)$ |

Update: measure breakaway torque and
update $H5(\emptyset_s, t_s)$
and
$H_5'(\emptyset_s, t_s)$ Operation, wandering:

| | |
|---|---|
| $D\emptyset = -1$ | ;init wandering direction |
| If $d\emptyset/dt < k_{5c}$ and $sgn(d^2\emptyset/dt^2) \ne sgn\,d\emptyset/dt$ | |
| | ;approaching stop? ;$k_{5c}$ is small |
| $Sw_{5c} = 1$ | ;wander |
| $t_{5c}\text{lim} = ran(0, 1)$ | ;random limit to wander time |
| $t_{5c}\text{lim} = t + t_{5c}lim$ | ;set ahead – $t$ is current |
| $v_{5c} = D\emptyset * v_{5c}$ | ;set direction, velocity |
| While $t < t_{5c}\text{lim}$ | |
| $F_{5c} = v_{5c}$ | ;motor integrates rotation |
| Else $D\emptyset = D\emptyset*(-1)$ | ;new direction |

To facilitate breakaway-friction management a delay interval of a few milliseconds from the delay buffer 89, which may be a circular buffer in microcomputer 81 memory as in FIG. 2a or implemented separately in supporting hardware as in FIG. 2b, may be applied to the applied audio signal $V_{in}$ 82D before input via line 91 to the functions in microcomputer 81 and subsequent transmission to the power amplifier 75 and torque motor 23. Such a delay would-compromise operation of a middle- or high-frequency range loudspeaker with other loudspeakers in the same system, as a delay of each millisecond is a phase shift of about 100 degrees at 300 Hz and increases with frequency. But sources of low-frequency sounds difficult for a user to locate and wide latitude is available in subwoofer placement within a typical residential room or vehicle (below 100 Hz. 2 milliseconds is less than 30 degrees). A delay of 2 milliseconds, the nominal value in this invention, is roughly equivalent to moving the subwoofer 2 feet away from the user, a negligible amount. The "preview" afforded by microcomputer 81 sampling of the applied audio signal $V_{in}$ 82 before passage through the delay buffer 89 permits antifriction processing to be more easily managed, e.g., if vane assembly 58 rotation, despite low $d\emptyset/dt$ and opposing $d^2\emptyset/dt^2$, is not in fact going to stop because the acoustic waveform is not approaching a local peak or plateau, none of the antifriction techniques above need be applied, and computer processing cycles may be diverted to other functions such as updating or smoothing table data. If indeed rotation is approaching a local peak or plateau and will stop, the antifriction processes may be invoked. If appropriate, the delay permits computer data sampling period $\Delta t$ to be decreased near peaks and plateaus to improve antifriction data resolution.

When the preview is used, the reproduced sound is taken from the delayed signal on line 91, and the antifriction decision-making data are from the undelayed signal on line 82D. In order for the antifriction sensing to be properly phased with rotation of the rotor assembly 58, line 82D must feed a digital filter within microcomputer 81 which has, to a reasonable approximation, the same gain and phase characteristics as the open-loop control system including microcomputer 81, amplifier 75, motor 23, and position encoder 24. This should include at least an integrator miming the motor 23 and rotary acoustic radiator 22 and additional poles matching the motor and armature poles if they lie in the working frequency band of the apparatus.

Torque motor cooling—initialization. A rotary acoustic radiator 22 formed of metal is a potentially efficient heat sink for the torque motor 23. Torque motor-heated air is cyclically swept into the cylinder 51 from a cabinet 26 with each cycle of the rotor assembly 58. This airflow is turbulent, hence effective in transferring torque motor 23 heat to the cylinder sidewalls 52. Though heat transfer through the movable vanes 71 and 72 to the outside environment is limited by their lightweight internal structure, the stationary vanes 62 and 63 may have high conductivity to conduct heat through themselves and to conduct heat to the cylinder sidewalls 52 and end walls 54 and 56, which cylinder walls 52 and end walls 54 and 56 are being swept alternately by air from the cabinet 26 and outside air. When cylinder 51 is provided with cylinder sidewall 52 user-side ports and cabinet-side end wall ports as hereinafter described, the cylinder 51 outside walls may be swept by pumped air suitably deflected from the user-side ports. The stationary vanes 62 and 63 and cylinder 51 outside walls may be provided with fins (not shown) to provide increased surface for heat transfer and dissipation. In a large unit (750 cu. in. displacement/stroke), torque motor heat of 300 watts at full power output may be transferred and dissipated with an air temperature rise of less than 5 degrees C. Smaller units are more easily cooled because of their higher surface-to-volume ratio.

The nominal ambient temperature torque motor armature winding resistance is determined during the startup protocol as follows. $Sw_6$ is closed. The microcomputer 81 generates a test voltage which is applied to the armature to measure $R_a = (V_d - V_s) \cdot R_s / V_s$. This voltage must be small enough that significant motor 23 counter emf is not generated, and if alternating, of angular frequency well below $R_a/L_a$, the armature pole.

Torque motor cooling—operation. In normal operation, for a given acoustic output, air velocity into cabinet 26, particularly if directed through end ports as in FIG. 7 hereinbelow, is adequate to cool the torque motor 23, as air velocity is constant independent of frequency. If deadspace between rotary acoustic radiator cabinet-side ports, as for example 123-and 124, and the armature of the torque motor 23 is kept small, cooling of the torque motor 23 in the upper end of its frequency range is also adequate. At lower frequencies deadspace is less important, as displaced air volume per cycle is larger. However, in a transition from extended loud to soft sound passages, stored armature heat must be dissipated or distributed into the torque motor 23 mass. When the microcomputer 81 detects such an average audio signal level transition as a decrease of average absolute value of rotor assembly 58 displacement Ø below a defined threshold such as 10 percent of Ømax, and the armature temperature is high, e.g., more than 45 degrees C. above ambient, as indicated by a rise in armature resistance $R_s$ of about 15 percent above nominal, the microcomputer 81 closes $Sw_6$ and produces an infrasonic signal at $F_6$ (typically 3 Hz) which produces in turn a vane movement of 10 to 15 percent of maximum angular deflection ±Ømax sufficient to dissipate accumulated armature heat in the absence of large output. The infrasonic signal at $F_6$ is continued until the armature temperature is reduced to a specified temperature above ambient, typically 20 degrees C., as determined by periodic measurement of armature resistance $R_a=(V_d-V_s)\cdot R_s/V_s$ by the microcomputer 81. The time required for temperature reduction is typically several minutes. This cooling technique potentially reduces maximum available volumetric efficiency somewhat but offers substantially silent dissipation of accumulated torque motor 23 heat without cost or noise of additional equipment. This reduction can be substantially obviated as described hereinbelow.

Example pseudocode cooling algorithms are:

Initialization:

| | |
|---|---|
| $Sw_0, Sw_{1c}, Sw_{1d} = 0$  $Sw_6 = 1$ | ;no input, feedback |
| $v_6 = k_6 \sin j10t$ | ;low voltage, frequency |
| $R_{aa} = (V_d - V_s)*R_s/V_s$ | ;armature $R$ at ambient |
| $Sw_0, Sw_{1c} = 1$  $Sw_{1d}, Sw_6 = 0$ | ;normal operation |

Operation:

| | |
|---|---|
| $Øavg = (49*Øavg + |Ø|)/50$ | ;sample every second |
| While $R_a < 1.15*R_{aa}$ or $Øavg > 0.05*Ømax$ | |
| | ;rotor cool or active? |
| wait | |
| Else $Sw_6 = 1$ | ;start cooling |
| $v_6 = 0.1*Ømax*\sin jw$ | ;$w \approx 20$ |
| If $R_a > 1.07 R_{aa}$ | ;continue cooling |
| wait | |
| else $Sw_6 = 0$ | ;cool enough, stop |

Bearing wear distribution—operation. Bearings used for oscillating loads tend to localize wear, as the load-bearing operating points of bearing surfaces are most often near the index position C. Antifriction bearings may concentrate wear unevenly over the surface of their races and rolling elements (balls, needles, rollers). In the present invention, which typically uses ball bearings, the microcomputer 81 closes $Sw_7$ and generates at $F_7$ a low amplitude random infrasonic voltage $V_7$. This infrasonic signal $V_7$ continuously shifts the rotational operating point of the rotor assembly 58 about the index position C.

If bearing rolling elements have small diameters this movement is sufficient to assure that said rolling elements roll over in their races every few minutes, improving wear distribution. This slow wandering reduces maximum available volumetric efficiency. This reduction can be substantially obviated as described hereinbelow. An example pseudocode bearing wear distribution algorithm is:

Initialization:

| | |
|---|---|
| $Sw_7 = 1$ | ;turn on wandering |
| $t_w = 0$ | ;init wandering time |
| sign = 1 | ;and direction |
| rn = ran(1) | ;random number |

Operation:

| | |
|---|---|
| $t_w = t_w + \Delta t$ | ;increment time |
| If $(0.0001*t_w) < rn$ | ;for a while |
| or $|Ø| > Ølim$ | ;or until rotated too far |
| $v_7 = v_7*sign$ | ;wander slowly |
| wait | |
| Else sign = (−1)*sign | ;change direction |
| $t_w = 0$ | ;reinitialize |
| rn = ran(1) | ;new wandering time |

Fast Centering—operation. Reductions of maximum volumetric efficiency due to functions which manage bearing breakaway friction, torque motor cooling, and bearing wear may be consolidated. Together they reduce momentary maximum acoustic output no more than 1.5 db, not normally detectable by the user. In the presence of high level applied audio signal $V_{in}$ on line 82A producing angular rotations Ø of more than 50 percent of Ømax, the duration of this small maximum output reduction is limited to a fraction of a second as the microcomputer 81 centers the rotor assembly 58 operating point on the index operating point C for the duration of the loud passage and for a short time, typically 30 seconds, thereafter, by suppressing the bearing breakaway friction, torque motor cooling, and bearing wear management signals and closing the fast centering feedback loop. This is done by opening $Sw_{5c}$, $Sw_6$, and $SW_7$, and momentarily (typically 0.1 second) increasing the bandwidth of the centering position feedback system by opening $Sw_{1c}$ and closing $SW_{1d}$. The system is returned to normal, with $Sw_{5c}$, $Sw_6$, and $Sw_7$ closed when Ø has remained below 30 percent of Ømax for 30 seconds.

An example pseudocode fast centering algorithm is:

| | |
|---|---|
| If $|Ø| > 0.5*Ømax$ | ;large input? |
| $Sw_{1c}, Sw_{5c}, Sw_6, Sw_7 = 0$  $Sw_{1d} = 1$ | |
| | ;inhibit management, fast center |
| wait 0.1 second | ;time to center |
| $Sw_{1c} = 1$  $Sw_{1d} = 0$ | ;normal centering |
| If $|Ø| > 0.3*Ømax$ | ;input still large? |
| $t_w = 0$ | ;reset wait |
| Else $t_w = t_w + \Delta t$ | |
| If $t_w > 30$ seconds | ;back to quiet |
| $Sw_{5c}, Sw_6, Sw_7 = 1$ | ;resume management |

From the foregoing it can be seen that the rotary acoustic transducer apparatus 21 may include microcomputer control of movable vane centering, movable vane rotation limiting, motor cooling, and bearing wear. Microcomputer 81 functions also may include calibrating and correction of torque motor nonlinearity, air compliance nonlinearity, vane edge leakage, and bearing breakaway friction. With the exception of the centering system, these functions should all be distinguished from negative feedback control, commonly defined as "control by sensing of the controlled variable" and usually implying concurrent sensing and controlling in the same frequency band as the useful bandwidth of the device, in this case from about 10 to 160 Hz. The useful frequency response capability below and above the 20 to 80 Hz nominal working bandwidth contributes to well-controlled user-perceived frequency response of the apparatus. Negative feedback is commonly used to reduce distortion of audio devices and commonly associated with audible responses to input transients which include transient frequencies not found in the input source signal. In this apparatus centering system negative feedback loop frequency upper limits are far below user-perceivable frequencies, usually below 1 Hz.

The control approach in this invention has two broad parts: Apparatus management, and calibration, rotation limitation, and forward error correction. Apparatus management functions comprised of centering, motor cooling, and bearing wear are implemented at infrasonic (i.e., below 20 Hz) frequencies well below audible frequencies and therefore not perceivable to the user. Calibration, rotation limitation, and forward correction functions, which are implemented in and above the useful bandwidth of the apparatus, use corrections derived from historical data accumulated and stored in tables in microcomputer 81 memory added to the applied audio signal $V_{in}$ 82D in such a fashion that the sound output of the apparatus is corrected for major sources of nonlinearity, resulting in high level of output linearity, i.e., low distortion.

The use of negative feedback is not forestalled by forward error correction. Rather the effect of the extensive forward correction is to reduce considerably, perhaps 10 to 20 db, the amount of negative feedback needed, if indeed it is used, to achieve a given level of output distortion.

The rotary acoustic radiator assembly 22 of the present invention is suited for reproducing sounds in the nominal working bandwidth of 20 to 80 Hz, acting much like a point source, as the dimensions of a large model of a rotary acoustic radiator, in particular the distance between centers of ports 64 and 66 in the first or top end wall 54 (e.g., about 9 inches), are small relative to the wavelength (approximately 14 feet) of the highest frequency to be reproduced.

With the rotary acoustic radiator assembly 22 mounted in a cabinet 26 as shown in FIG. 1 with the ports 31 and 32 in the cabinet 26 in registration with the ports 64 and 66 in the first end wall 54, air movements in cabinet ports 31 and 32 at low amplitudes fuse into a single acoustic pressure wave within a relatively short distance from the apparatus 21 even if a diffuser-attenuator is not used. At high amplitudes port exhaust plume air velocities for the ports 31 and 32 may approach 100 miles per hour in a rotary acoustic radiator assembly 22 displacing less than 750 cubic inches of air per stroke. This exhaust plume, which unmodified would create a distributed sound source, is slowed in a diffuser-attenuator as shown in FIG. 1 to transform plume kinetic energy into potential energy to thereby cause fusion of the port exhaust plume energy into a single acoustic wave within a relatively short distance from the apparatus 21.

Typically there are no significant compliant members linking the stationary and moving parts of the rotary acoustic transducer apparatus. The rotor assembly 58, the torque motor 23, and the position sensing means 24 are rotatable components which are balanced about the longitudinal axis 53 so that there are no net positioning forces to move them from any rotational position. If mounted in a literally "infinite baffle," the rotatable components are without a low-frequency resonance and may be easily driven to frequencies below 1 Hz. In practice the size of a cabinet 26 and the compliance of the air within a cabinet 26, together with the movable vane area and the moment of inertia of all rotating components combined, set the low-frequency resonance of the apparatus 21. As noted hereinabove, typically this resonance is at 3 to 6 Hz, well below the audible frequency spectrum.

Volumetric efficiency, which is the percentage of the rotary acoustic radiator assembly 22 internal volume which may be swept by the movable vanes 71 and 72 in a single stroke, is limited as shown in FIGS. 2a, 2b and 3 by the thickness of movable vanes 71 and 72, stationary vanes 62 and 63, and the areas of ports 64 and 66 and 67 and 68.

For the apparatus 22 the volumetric efficiency is about 60 percent, which compares favorably with less than 15 percent for a conventional low-frequency loudspeaker cone assembly. Nevertheless the largest possible volumetric efficiency is desirable, both to increase acoustic output and for certain other apparatus management and distortion reduction purposes described hereinbefore. Vane thicknesses are small and difficult to reduce. Reduction in port areas increases volumetric efficiency at the expense of increased port air velocities.

Figure 4:
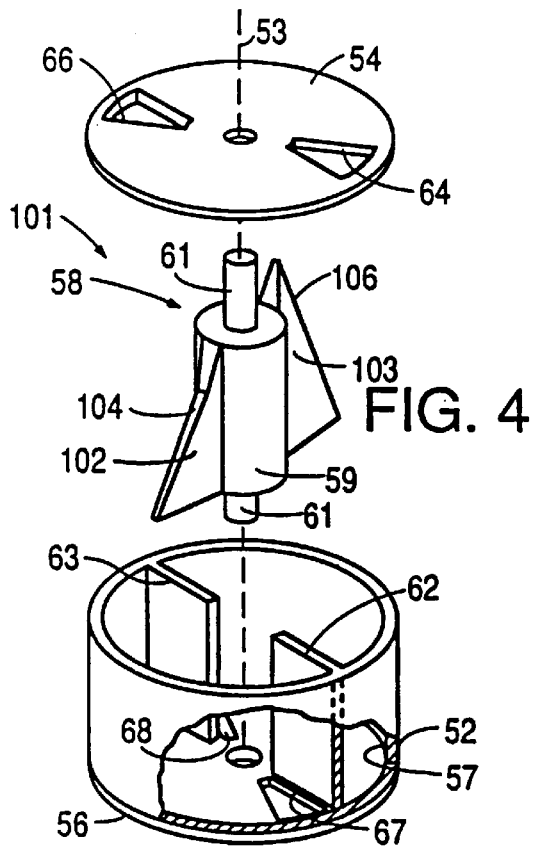

FIG. 4 shows an alternative rotary acoustic radiator assembly 101 similar to that of FIG. 3 except that the movable vanes 102 and 103 attached longitudinally at the hub 59 are formed—twisted—so that the outer margins are offset or tilted clockwise in an upward direction relative to the longitudinal axis 53 of the rotary acoustic radiator 101. The vane deflection at the cylinder sidewall 52 is roughly equal to the port width at the sidewall 52, causing the movable vanes 102 and 103, when rotated to their extreme counterclockwise positions, to subtend the same angular space about the longitudinal axis 53 as the ports 67 and 68. For example, if rotor assembly 58 is rotated counterclockwise to its extreme position, the upper margin of movable vane 102 will approach the upper margin of stationary vane 62 while the lower margin of movable vane 102 approaches the left margin of port 67 as viewed in FIG. 4. Thus the movable vanes 102 and 103 travel through substantially 180 degrees, less the total of the angles subtended by the port width, the thickness of the movable vanes 102 and 103, and the stationary vanes 62 and 63. Assuming that the port width is 30 degrees and the vanes in total subtend 15 degrees, this has the same effect on volumetric efficiency as removing one port set, and provides a gain in volumetric efficiency to about 75 percent without changing the port air velocity from that of the embodiment shown in FIGS. 2 and 3.

In FIG. 5 there is shown another embodiment of the rotary acoustic radiator assembly of the present invention. The radiator 107 achieves approximately the same volumetric efficiency gain as the radiator 101 in FIG. 4 by forming—twisting—the stationary vanes 108 and 109 rather than the movable vanes 71 and 72 so that their inner margins are parallel to the longitudinal axis 53 and their outer margins are offset or tilted clockwise in an upward direction along the cylinder sidewall 52. This embodiment brings the ports substantially into longitudinal or vertical alignment in the same angular sectors about the axis 53, that is, ports 64 and 67 are longitudinally or vertically aligned and 66 and 68 are as well. The same port air velocities and volumetric efficiency are achieved as in FIG. 4.

The air velocities through the relatively small radial ports shown in the embodiments in FIGS. 2 through 5 associated with high volumetric efficiency can be high, increasing requirements that the diffuser-attenuator, such as the diffuser-attenuator 36 shown in FIG. 1, slow the airflow presented to the user environment. Increased air velocity on the cabinet side of the apparatus due to reduced cabinet-side port area may be advantageous in affecting heat transfer from the driving torque motor 23.

Increased cabinet-side port air-turbulence noise is not a significant problem because such noise can be absorbed by acoustic material (not shown) provided within a cabinet on the walls of said cabinet. Decreasing user-side port air velocity by increasing user-side port area reduces port turbulence noise.

An embodiment of the rotary acoustic radiator assembly utilizing these principles is shown in FIG. 6. The rotary acoustic radiator assembly 111 has stationary vanes 114 and 115 formed much like those shown in FIG. 5, but the overall deflection along the cylinder sidewall 52 is accomplished by a localized bend in stationary vanes 114 and 115. User-side ports 112 and 113 are provided in the cylinder sidewall 52 to increase total user-side port area and to reduce user-side port air velocity and noise. The user-side ports 112 and 113 are disposed near the upper extremity of the side wall 52 adjacent the stationary vanes 108 and 109 and overlie the ports 67 and 68.

In FIG. 7, in another embodiment of a rotary acoustic radiator assembly 116, stationary vanes 117 and 118 are formed in a Z-shape in cross section normal to the longitudinal axis 53 which permits full length user-side ports 121 and 122 to be provided in the cylinder sidewall 52, providing the lowest user-side port air velocity for a given angle subtended by ports and vanes. The cabinet-side ports 123 and 124 are reduced in area, but are well positioned to deliver cooling air to the torque motor 23. Ports 126 and 127 in the top wall 54 are reduced in area as shown to accommodate the Z-shaped stationary vanes. However, it should be appreciated that radial-sector-shaped full area ports, as shown in FIGS. 3 through 6, may be provided in the top wall 54 by somewhat more complex formation of the stationary vanes (not shown). The combined end and side porting on the user side and end porting on the cabinet side, as shown in this FIG. 7, produces minimum user-side airflow velocity for a given displacement and volumetric efficiency and hence the quietest user-perceived airflow.

In the embodiment of the rotary acoustic radiator 131 shown in FIG. 8, the stationary vanes 132 and 133 have a different form, user-side and cabinet end wall ports have been eliminated and user-side rectangular ports 134 and 136 and cabinet-side rectangular ports 137 and 138 are provided in the cylindrical sidewall 52. The stationary vanes 132 and 133 have upper offset portions 132a and 133a and lower offset portions 132b and 133b and intermediate adjoining portions 132c and 133c extending at right angles thereto. The ports 134 and 137 are in vertical alignment as are the ports 136 and 138. The user- and cabinet-side ports thus subtend the same angular sector about the longitudinal axis 53 of the radiator 131. The user-side ports 134 and 136 may have a vertical dimension along the axis 53 which is greater than that of the cabinet-side ports 137 and 138. Like the embodiments in FIGS. 4, 5, 6 and 7, this is a high volumetric efficiency embodiment.

The embodiments of FIGS. 4, 5, 6, 7 and 8 have in common vanes which may be simply described as "bent" in one or more planes or twisted. All vanes have two faces exposed to the air flow with dimensions large relative to their thickness. Though, as shown, movable vanes taper in thickness linearly from root to tip and stationary vanes do not, a variety of other thickness profiles is plausible for either movable or stationary vanes, e.g., exponential. The bent or twisted vanes have in common the geometric attribute that if a large number of lines are projected from points distributed uniformly over one face of a bent or twisted vane through the interior of the vane to the nearest point on the second face of the vane, and if the midpoints of all such lines are marked, said midpoints will not lie in a single plane, that is, the surface which is the locus of said midpoints is non-planar.

The edges of the ports in the embodiments hereinbefore described may be provided with smooth aerodynamic surfaces to promote laminar flow through the ports and minimize port flow resistance and generation of air turbulence noise which has predominantly high frequency components.

The cabinets for the embodiments of the radiators shown in FIGS. 2 through 5 may be of the same type as cabinet 26 shown in FIG. 1. The diffuser-attenuators also may be of the same type as diffuser-attenuator 36 shown in FIG. 1. The embodiment of the radiator 111 shown in FIG. 6 requires that it be raised through the cabinet top wall 28 (see FIG. 1) sufficiently to expose the sidewall ports 112 and 113. The diffuser-attenuator 36 also would be raised by a similar distance.

The rotary acoustic radiator 116 in FIG. 7 must be outside the cabinet, as for example on top of the cabinet top wall 28 of the cabinet 26 in FIG. 1, with cabinet-side ports 123 and 124 in registration with cabinet ports 31 and 32.

The rotary acoustic radiator 131 of FIG. 8 is supported in the cabinet top wall 28 so that the user ports 134 and 136 are above the cabinet top wall 28 and the cabinet side ports 137 and 138 are below the cabinet top wall 28.

All of the rotary acoustic radiator assemblies hereinbefore described have a construction which makes it easy to mount them in or on cabinets. Also, the cabinets can be of various shapes and sizes. For example, instead of a rectangular cross section, cabinets can have a circular or elliptical cross section, or they may be part of vehicular coachwork. The rotary acoustic radiator assemblies may also be operated without cabinets, as when mounted in the ceiling of a room, or in the coachwork of a vehicle so the cabinet- or back-side ports vent outside the vehicle.

Figure 9:
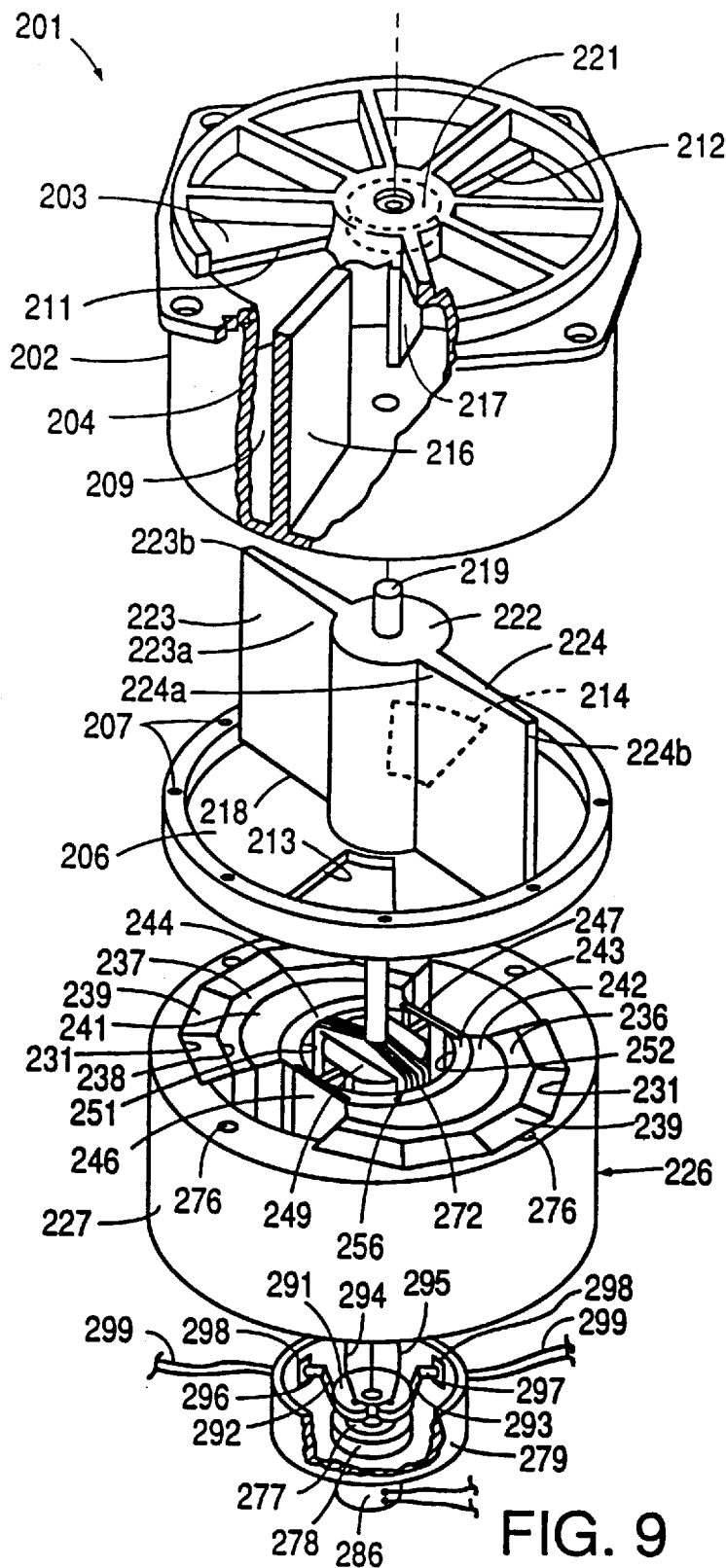
FIG. 9 is an exploded view, with certain portions broken away, of a more specific embodiment of a rotary acoustic transducer apparatus incorporating the present invention.

A more detailed embodiment of a sound reproducing apparatus or rotary transducer apparatus incorporating the present invention is shown in FIGS. 9 and 10. The apparatus is comprised of a rotary acoustic radiator 201 comprising a cylindrical housing 202. The housing 202 as shown has been machined from an aluminum casting to provide a radially ribbed first end wall or top wall 203 of 0.5 inch nominal thickness which is integral with a nominal 0.5 inch cylindrical side wall 204. A radially ribbed bottom or second end wall 206 of nominal 0.5 inch thickness is secured to the side wall 204 by suitable means such as cap screws (not shown) extending through holes 207. By way of example, the enclosed or cylindrical volume 209 within the housing 202 can have a suitable size, for example a 14 inch diameter with a height of 8 inches. The top wall 203 is provided with two radially extending sector or pie-shaped user-side ports 211 and 212 whereas the bottom wall 206 has similar cabinet-side ports 213 and 214, each of the ports subtending a suitable angle such as 30 degrees. Although the housing 202 can be mounted in any desired orientation, it is generally preferable to have the housing oriented vertically in which the first or top wall 203 overlies the second or bottom wall 206.

Radially extending stationary diametrically opposed vanes 216 and 217 are positioned within the cylindrical volume 209. These vanes 216 and 217 can be formed of 0.375 inch aluminum plate, and extend from the top wall 203 to the bottom wall 206.

A rotor assembly 218 is provided within the housing 202 and has a central axially extending shaft 219 formed of a suitable material such as aluminum. The upper end of the shaft 219 is rotatably mounted in a suitable bearing such as a sealed ABEC class 7 (very low noise) ball bearing assembly 221 mounted in the top wall 203. The rotor assembly 218 is constructed of materials so as to be relatively light in weight and so as to provide a low inertial mass. A hub 222 is mounted on the shaft 219 and has diametrically opposed radially extending vanes 223 and 224 which are secured to the hub 222. The vanes 223 and 224 are tapered in cross section in a radial direction to provide greater strength at the inner margins or roots 223a and 224a of the vanes 223 and 224. By way of example, the vanes 223 and 224 can have a thickness of ¾ inch at the roots 223a and 224a and approximately ⅜ inch at the distal margins or tips 223b and 224b. The hub 222 (e.g., 4 inches in diameter) can be formed of annealed Kevlar (trademark) foam. The movable vanes 223 and 224 can be formed of 4.5 lb. per cubic foot aluminum honeycomb core epoxy bonded to a very thin (0.003 inch) aluminum skin which forms the vane faces. Bonded skin doublers reinforce the roots 223a and 224a. In this way it is possible to distribute the stresses outwardly from the hub 222 towards the distal margins of the movable vanes 223 and 224 through the movable vane facing material.

Thus, it can be seen that the present invention in FIG. 9 utilizes two sets of at least two vanes each, one set of which is stationary, i.e., the vanes 216 and 217, and one set of vanes 223 and 224 each of which is movable. The smallest desirable number of vanes in each set is two because when they are diametrically aligned this number balances the high centrifugal forces generated in each of the vanes, which cancel each other in the two vanes. The two sets of vanes have approximately the same area.

An electric drive or torque motor 226 which is much like a large d'Arsonval galvanometer is provided for driving the rotor assembly 218 in a rotary reciprocating motion through a 110 degree maximum arc. The torque motor 226 consists of an outer housing 227 formed of a suitable material such as low carbon steel. The housing 227 is in the form of a cylinder or ring which has an outer diameter which corresponds to the outer diameter of the housing 202. The outer housing 227 serves as the main support for the other motor components and as a flux return path.

A plurality of five serially connected surfaces 231 are machined into opposite sides of the interior of the housing 227 and are separated by a suitable distance, as for example approximately 3 inches at the extremities of the same. The two series of five surfaces 231 serve to form a decagon which can be considered to be cut in half and separated by the 3 inches hereinbefore described. Mating flux concentrating pole pieces 236 and 237 formed of a similar material such as low carbon steel are disposed within the housing 227 and are provided with serially connected planar surfaces 238 which face the corresponding serially connected planar surfaces 231. Magnets 239 of a suitable material such as ferrite having trapezoidal upper faces are mounted between the pole pieces 236 and 237 and the surfaces 238 thereof, and the surfaces 231 of the housing 227. Thus, five magnets 239 are provided for each half of the decagon to provide a dipole field. The magnets can be of a suitable size, as for example 4 inches wide by 6 inches high by 1 inch in thickness, and have their sides beveled as shown in FIG. 9 so they fit closely to each other between the surfaces 231 and 238. The magnets 239 can be held in place in a suitable manner such as by bonding the same to the surfaces 231 and 238 by a suitable adhesive. In addition, safety pins (not shown) formed of a suitable material such as 7075 aluminum can extend diametrically from the flux concentrators 236 and 237 through the magnets 239 and be secured to the housing 227 to further ensure that the magnets are retained in their proper locations. By way of example, four of such pins can be provided which are spaced 90 degrees apart. The pole pieces 243 and 244 and flux concentrators 236 and 237 and 241 and 242 concentrate the magnet flux by approximately 2 ½ times to provide a total flux in gaps 251 and 252 of approximately 6 kilogauss. Pole pieces 243 and 244 are separated to reduce flux leakage and to ensure the flux passes through the appropriate portions of the drive motor 226.

It should be appreciated that it is possible to utilize more sophisticated magnetic materials, for example neodymium-based ferrite magnets, which may make it possible to eliminate the use of the flux concentrators 236 and 237 and thereby substantially reduce the size of the motor. However, because of the lower cost of the conventional ferrite material, ferrite material has been utilized in the torque motor 226 shown in FIG. 9.

Additional semi-circular flux concentrators 241 and 242 are provided which lie adjacent the flux concentrators 236 and 237. The semi-circular pole pieces 243 and 244 of soft iron are held in spaced apart positions by T-shaped support plates 246 and 247 formed of a suitable material such as aluminum and engaging opposite extremities of the pole pieces 243 and 244. The T-shaped support plates 246 and 247 also support a cylindrical core 249 of very pure iron of a suitable size, as for example 3 ½ inches in diameter and 4 inches in length. Thus, there are provided a pair of semi-circular spaces 251 and 252 between the pole pieces 243 and 244 and the central core 249.

A rotatable armature rotor 256 (see FIGS. 9 and 10) is disposed in the spaces 251 and 252 and is mounted upon the shaft 219 which extends through a hole (not shown) in the central core 249. The armature is comprised of spaced apart parallel legs or saddles 257 (see FIG. 10) that are U-shaped in cross section and which have "spiders" 258 and 259 disposed on opposite ends thereof but which are spaced therefrom by gaps 261 so that the spiders 258 and 259 are insulated from the saddles 257.

The top spider 258 is provided with a diamond-shaped central hub 262 which is adapted to be mounted on the shaft 219. The hub 262 is disposed between upstanding sidewalls 263 formed integral with a plate (not shown) that carries the hub 262. The sidewalls 263 bulge outwardly in a broad "V". The lower spider 259 is also provided with a hub 266 and is mounted on and is supported by four radially extending spring spokes 267 adjoining arcuate crosspieces 268 at their distal extremities. The crosspieces 268 have mounted thereon depending V-shaped structures (not shown) which abut the hub 266 to provide a diamond-shaped structure similar to the diamond-shaped hub 262. The spider 259 is also provided with upstanding spaced apart sidewalls 271 in the same manner as sidewalls 263 which also bulge slightly outwardly in a broad "V".

The saddles 257 and the spiders 258 and 259 are supported in a jig (not shown) to provide appropriate spacing, and then have wound thereon an insulated conductor to provide a winding 272. The jig is then removed. The armature rotor 256 preferably has a length which is greater than its width, as for example it can have a length of 6 inches and a width of 4 ½ inches, and is wound with a suitable conducting wire such as 16-gauge insulated aluminum wire. The wire is wound so that it extends over the spiders 258 and 259 on opposite sides of the hubs 262 and 266 between the spaced apart V-shaped sidewalls 263 and 271 and into the saddles 257. By way of example, in one embodiment of the invention approximately 390 turns were utilized in the armature rotor winding 272. The conducting wires are then held in place by a fiberglass-filled epoxy. The sidewalls 263 and 271 serve to prevent the winding 272 from spreading apart, whereas the diamond-shaped structures associated with the hubs 262 and 266 serve to prevent the windings from collapsing inwardly.

The spring spokes 267 of the spider 259 are approximately 1000 times more compliant axially than they are tangentially. They serve to transfer torque from the winding 272 to the hub 266 while being able to flex longitudinally of the torque motor rotational axis as the winding 272 expands and contracts with changing power input without having any tendency for the armature legs 267 to bow outwardly and touch the pole pieces 243 and 244. The thin (0.014 inch) longitudinal aluminum saddles 257 are bonded to the inner and side surfaces of the legs 267 of the armature winding 272 to stiffen the armature winding 272 against lateral deflection during acceleration.

The torque motor housing 227 is secured to the bottom plate 206 by suitable means such as four through bolts (not shown) spaced 90 degrees apart and extending through holes 276 in the housing 227. The shaft 219 extends beyond the armature rotor 256 and is rotatably mounted in a lower bearing assembly 277 and of the same type as bearing assembly 221. The bearing assembly 277 is mounted in a carrier 278 which is secured to the end wall of a bearing support housing 279 secured to the lower faces of the pole pieces 243 and 244 by bolts (not shown).

A position encoder 286 is mounted on the shaft 219 and is secured to the lower bearing housing 279. The position encoder 286 senses rotation of the armature 256 which can travel through a suitable angle, as for example 110 degrees. It has a resolution of about 125 bits per 10 degree of rotation. The information from the position encoder 286 can be utilized for providing velocity information or acceleration information for controlling the torque motor 226.

Power is supplied to the armature 256 through a capstan 291 mounted on the shaft 219 above the bearing 277. The capstan 291 is formed of a suitable insulating material such as Delrin. Flexible conducting foil strips 292 and 293 formed of a suitable spring-like, fatigue-resistant conducting material such as a 0.004 inch thick beryllium copper each have one of their ends mounted in spaced apart separate slots in the capstan 291. The strips 292 and 293 are connected by leads 294 and 295 which extend from the capstan 291 and are connected to opposite ends of the winding 272 of the armature 256. At rest, the strips 292 and 293 each subtend approximately 90 degrees on the capstan 291 and are connected to conductive fishing pole-like tensioning leaf springs 296 and 297 about 1.5 inches long, formed of thicker (0.018 inch) beryllium copper. The leaf springs 296 and 297 are mounted in insulating support blocks 298 mounted in the lower bearing housing 279. Leads 299 connected to the leaf springs 296 and 297 extend from the support blocks 298 and are connected to the microcomputer-adjusted applied audio signal from the power amplifier. The leaf springs 296 and 297 have sufficient length so that they can accommodate somewhat more than the 110 degrees reciprocating rotational movement of the armature 256 as it travels through its maximum excursions.

The operation of the embodiment of invention shown in FIGS. 9 and 10 is very similar to that hereinbefore described in conjunction with the embodiment shown in FIGS. 1 and 2. The movable vanes 223 and 224 which are fastened to the shaft 219 and hub 222 are driven in rotary reciprocation that follows the microcomputer-adjusted audio signal applied to the torque motor 226. The distal margins 223b and 224b of the movable vanes 223 and 224 are very close to the internal wall of the housing 202 so that as they move they sweep substantially all of the radial projection of the housing 202 excepting the area of the shaft 219 and hub 222 at any point in their rotation. The inner margins of the stationary vanes 216 and 217 are also very close to the hub 222 carrying the movable vanes 223 and 224 so that the small gaps therebetween function as seals because the leakage is very small in comparison to the air which is transported through the ports 211 and 212 and the ports 213 and 214.

It should be appreciated that if it is desired to provide a still better seal, labyrinth-type seals can be utilized between the stationary vanes 216, 217 and the hub 222. A flexible material such as fabric or rubber connecting stationary vanes 216, 217 and hub 222 may also be used, although a flexible material introduces a compliance which will create or modify the low-frequency resonance of the rotary acoustic radiator assembly. Distortion of reproduced sounds may also occur.

The surfaces of the stationary vanes 216, 217 can be provided with sound absorption materials (not shown) to absorb the relatively high frequency sounds of seal leakage and port turbulence. The thickness of this material may be significant relative to the port width as long as this material is relieved near the ports so that air flow through the ports is not impeded. Such acoustic material also may serve as an effective shock absorbing crash barrier for the movable vanes should they overrun their normal maximum excursion. Also, the surfaces of the movable vanes may be covered or patterned with visco-elastic materials (not shown) for damping of high frequency (several hundred Hertz) natural resonances in the vanes, from the sounds originating in the bearings, and to provide minor amounts of sound absorption for seal and port air turbulence noises.

The bearings as hereinbefore described should be as quiet as possible because the cylindrical means and the stationary and movable vanes serve as efficient low-dissipation sound radiators. The loads on the bearings are small because the motor armature, motor shaft, and rotor assembly are statically and dynamically balanced unless there is asymmetric dynamic loading due to port obstruction.

In operation the foil strips 292 and 293 roll smoothly on and off the capstan 291 as the shaft 219 rotates. They make no acoustic noise perceptible with the rotary acoustic radiator 201 operating and no electrical noise at all. The torques of the two lead assemblies counteract each other, placing substantially no net positioning torque on the shaft 219. With this construction there are no commutating brushes or slip rings to wear and create noise and distortion. If greater rotational excursion is required for a very high volumetric efficiency rotary acoustic radiator assembly, the two foil and tensioning leaf spring assemblies can be displaced from the same radial plane (as shown in FIG. 9) by moving one assembly longitudinally relative to the rotational axis of the armature 256 and securing the capstan ends of the foils 292 and 293 so they lie beside each other for some angular distance about the circumference of the capstan 291.

The torque motor 226 has a ratio of full torque to worst-case breakaway torque from all sources, including bearing grease seals, of about 1000:1 or 60 db. This compares very favorably with about 40:1 (32 db) for low-inertia brush-commutated high-quality basket-wound motors. The difference reflects the two motors' respective propensity to distort low level audio output of the rotary acoustic transducer assembly.

In FIG. 11 there is shown a diffuser-attenuator 301 suitable for the rotary acoustic radiator assembly 116 of FIG.

7 and rotary acoustic radiator assembly 131 of FIG. 8. Assuming that the radiator 116 in FIG. 7 is used, the radial sector user-side end ports 126 and 127 are not used but user-side ports 121 and 122 in the cylinder sidewall 52 are used. The cabinet 302 is like cabinet 26 shown in FIG. 1. Cabinet ports (not shown) register with the bottom end wall ports 123 and 124 in the rotary acoustic radiator assembly 116. In FIG. 12 the rotary acoustic radiator assembly 305 is mounted external to the cabinet 302 on top of the cabinet top wall 304 while the torque motor 306 and the position encoder 307 are mounted within the cabinet 302. The top baffle 311 is mounted above the top of the cabinet 302 by bolts and spacers (not shown). An intermediate baffle 312 is mounted over the rotary acoustic radiator assembly 305 and is secured to the cabinet 302 by bolts and spacers (not shown) and roughly divides the user-side ports 308 and 309 horizontally in half. Baffles 311 and 312 may be mounted to the rotary acoustic radiator-assembly 305 to improve sinking of torque motor 307 heat. Diffuser-attenuator air duct wall components 316, 317, 318 and 319 are provided and are bonded between the surfaces of the top of the cabinet 302, intermediate baffle 312, and top baffle 311.

The components 316–319 are provided with outer surfaces which are nominally in alignment with the outer margins of the baffles 311 and 312 as well as of the cabinet 302 (see FIG. 12). The components 316–319 are provided with arcuate surfaces 321 which are opposite the ports 308 and 309 and are spaced therefrom. Arcuate blanket components 326, 327, 328 and 329 are bonded to the outside surface of the rotary acoustical radiator assembly 305 between the horizontal margins of ports 308 and 309 and the top of the cabinet 306, intermediate baffle 312 and the top baffle 311. Together these diffuser-attenuator components effectively create eight air ducts 331 with throats at the user-side ports 308 and 309 and mouths at the edges of the top of the cabinet 302, intermediate baffle 312 and top baffle 311. It should be appreciated that additional intermediate baffles and corresponding air duct wall components may be used if desired. For a small rotary acoustic radiator assembly, the diffuser-attenuator 301 may be built without an intermediate baffle. If user-side end ports are included in the rotary acoustic radiator assembly, additional components can be provided for the diffuser-attenuator, like those in FIG. 1. The diffuser-attenuator means may include screens or filters (not shown) to shield the parts of the rotary acoustic radiator assembly from foreign bodies and also to protect users.

Figure 13:
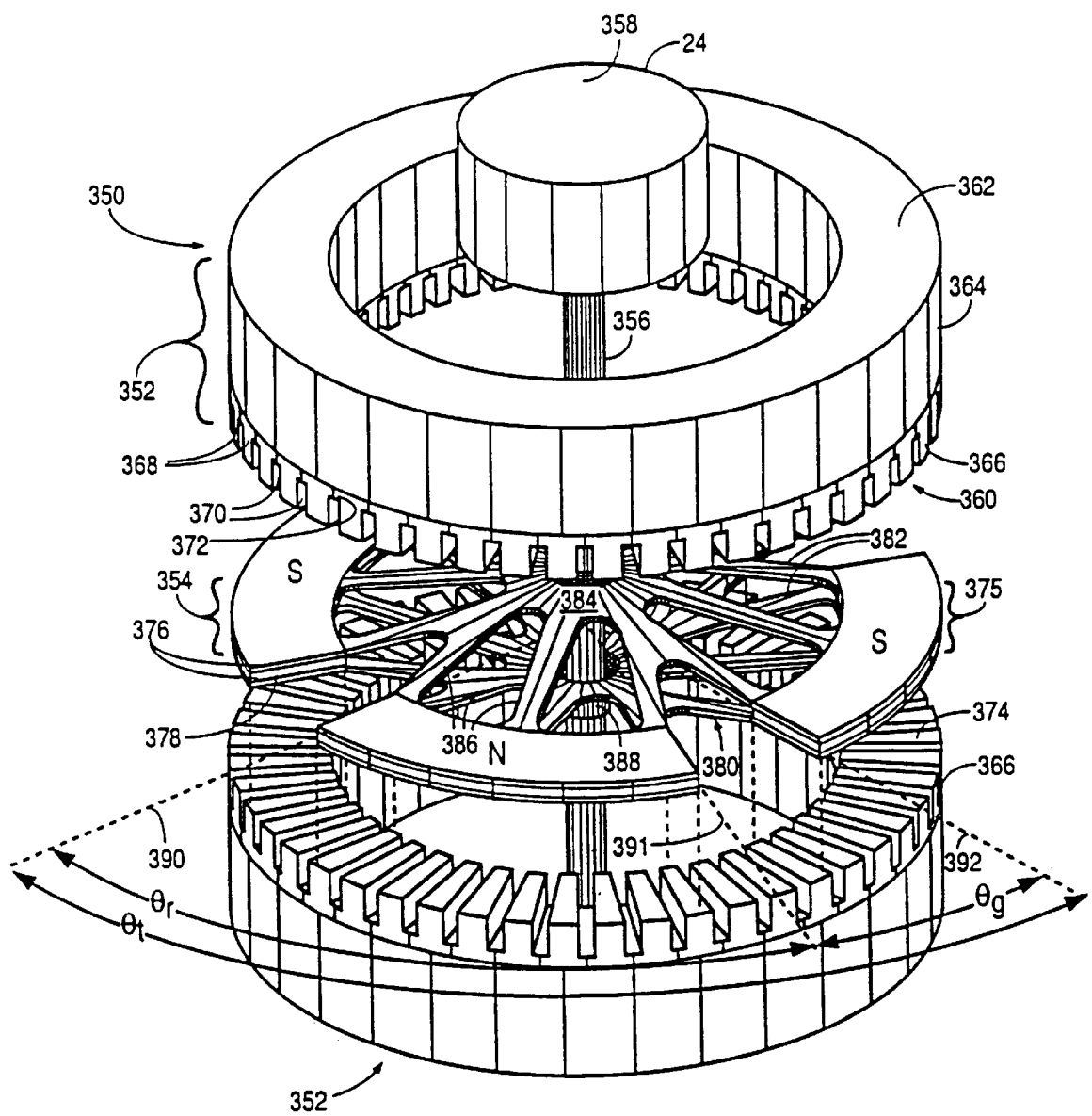
FIG. 13 is a computer-aided wireframe isometric partially exploded view of an axial-gap multipole brushless commutated torque motor illustrating the relationship of rotor pole segments and stator poles.

FIG. 13 shows selected electromagnetically active components of an axial-gap brushless commutated torque motor 350 having two stator assemblies 352 and a multipole rotor assembly 354. The position sensing device controlling commutation is the position encoder 24 described hereinabove. The multipole rotor assembly 354 is affixed to a shaft 356 supported in bearings (not shown) for rotation about a motor longitudinal axis 358. Each stator assembly 352 is a substantially solid ferromagnetic ring supported coaxially with the shaft 356 and multipole rotor assembly 354, said ferromagnetic ring having radial thickness, axial length, an inner and an outer circumference, a first axial face 360 disposed proximally to the multipole rotor assembly 354 and a second axial face 362 disposed distally from the multipole rotor assembly 354. As shown in the example of FIG. 13 the stator assembly 352 is a composite structure comprised of two ferromagnetic components—a wound cylindrical core 364 of ferromagnetic strip material and a stator pole assembly 366 molded of ferromagnetic powder and bonded to the wound cylindrical core 364 with structural adhesives.

Figure 14:
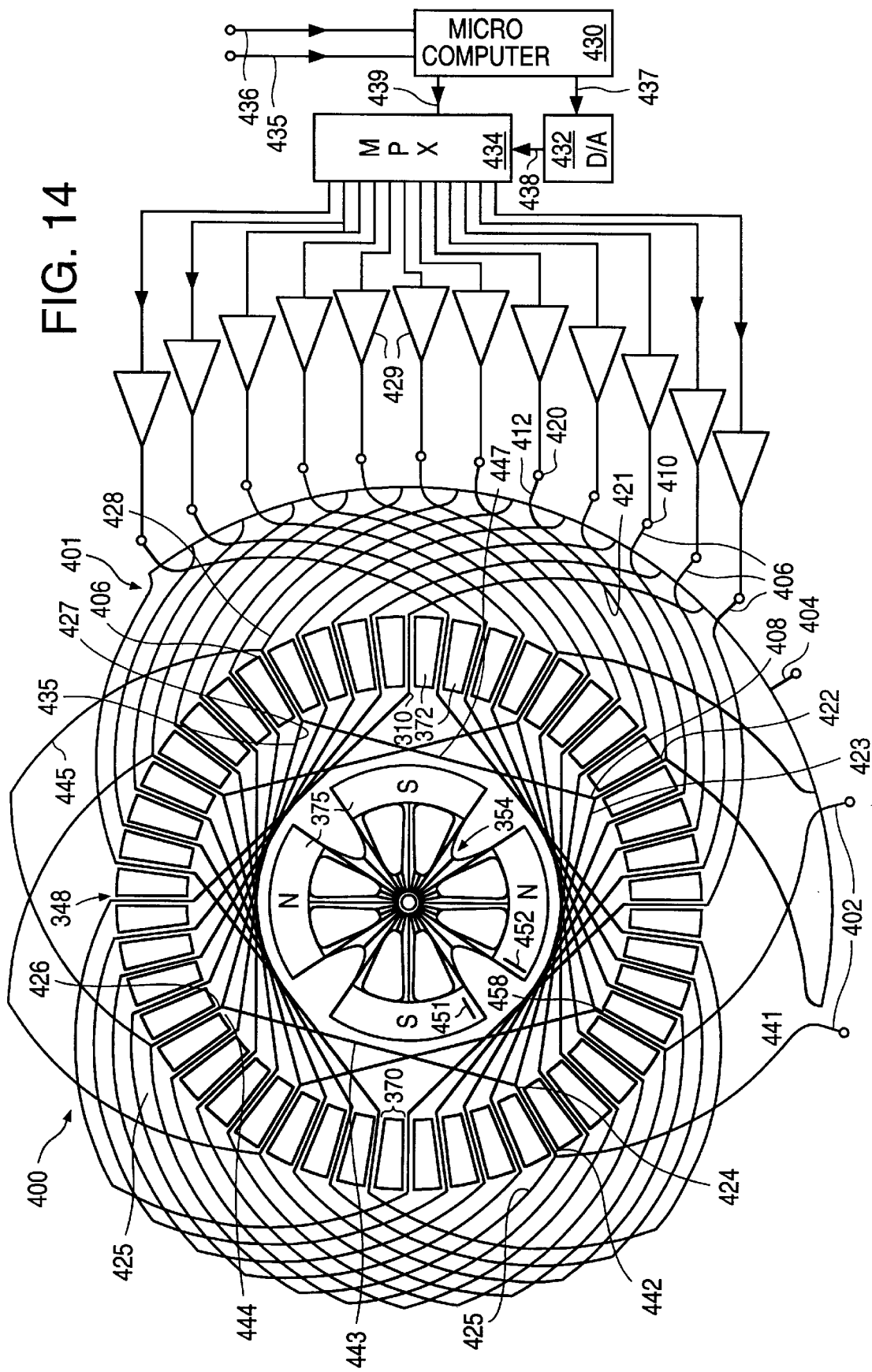
FIG. 14 is a schematic diagram of the winding pattern of an axial-gap multipole brushless electric motor and its associated driving electronics.

A plurality of radially-oriented poles 368 and stator winding slots 370 is disposed alternately at equal intervals about the first axial face 360 of the stator assembly 352. Each stator pole 368 extends axially from a stator pole root 372 adjacent to the closed ends of the two adjacent winding slots 370 to a stator pole 368 tip or face 374 disposed generally normal to the motor longitudinal axis 358 adjacent to the multipole rotor assembly 354. Each stator pole 368 extends radially from the inner circumference to the outer circumference of the stator assembly 352. A plurality of electrical conductors is placed in the stator winding slots 370 as described hereinbelow (FIG. 14).

The multipole rotor assembly 354 is comprised of a plurality of arcuate circumferentially spaced-apart ferromagnetic rotor pole sectors 375 having radial extent, angular extent, and axial thickness, each rotor pole sector 375 disposed normally to the motor longitudinal axis 358. Each rotor pole sector 375 is comprised of three layers: two pole pieces 376 of generally plane ferromagnetic material having radial extent, angular extent, and axial thickness separated axially by a magnet 378, said magnet 378 being an arcuate sector of permanently magnetized ferromagnetic material having radial extent, angular extent, and axial thickness disposed normally to the motor longitudinal axis and magnetized parallel to the motor longitudinal axis. The pole pieces 376 are bonded to the magnets 378 with structural adhesives. Each magnet is so magnetized that the polarity of the magnets 378 and their axially adjacent pole pieces 376 alternates from rotor pole sector 375 to rotor pole sector 375 around the multipole rotor assembly 354.

Each rotor pole sector 375 is joined to a hub 380. As shown in this FIG. 13 said hub 380 consists of two substantially identical hub-half structures 382. Two such hub-half structures 382 are mounted facing each other as mirror images on the shaft 356. Each hub-half structure 382 is comprised of a plurality of hub radial sectors 384 disposed at angles about the motor longitudinal axis 358 and each hub radial sector 384 is comprised of a plurality of radial spokes 386 joined to a common central bushing 388 and to the pole pieces 376. The two hub-half structures 382 are rotationally aligned on the shaft 356 so that their spokes 386 and the pole sectors 375 affixed thereto are in angular registration about the motor longitudinal axis. The central bushing 388 of each hub-half 382 is affixed to the shaft 356 so that said rotor pole sectors 375, said hub 380 and said shaft 356 rotate as a unit. In this example it may be seen that the spokes 386 of the hub 380 are disposed at angles to a plane normal to the motor longitudinal axis 358 to resist the axial magnetic attraction forces between multipole rotor assembly 354 and adjacent stators assemblies 352, particularly during motor 350 fabrication, when said axial forces may be unequal and large.

When assembled in a brushless commutated torque motor 350, the multipole rotor assembly 354 is approximated to the two stator assemblies 352 with a narrow (0.010 in.) axial airgap (not shown) on each side of the rotor pole 375 sectors.

Magnetic flux from a pole piece 376 of the multipole rotor assembly 354 having a given magnetic polarity enters the face 374 of a given stator pole 368, leaves the root 372 of said stator pole 368, enters the wound cylindrical core 364, traverses an arc in the wound cylindrical core 364 of average length 360/(number of rotor pole sectors 375), enters the root 372 of another stator pole 368 and leaves the face 374 of said stator pole 368 to return to a rotor pole sector 375 of opposite magnetic polarity. Torque is produced by currents in conductors placed in the stator slots 370 interacting with the magnetic fields of the rotor pole sectors 375.

The large number of stator poles 368 limits the influence on motor torque of a single stator pole 368, i.e., if there are 12 stator poles 368 for each rotor pole sector 375, the influence of one stator pole 368 on total torque of that rotor pole sector 375 is roughly 8 percent, and if the stator poles 368 and their adjacent windings are alike within 10 percent and do not of there own geometry generate torque ripple, an overall rotor pole sector 375 and hence motor torque ripple of 1 percent is possible.

In this invention the rotor pole sectors 375 in the multipole rotor assembly 354 each subtends an arc substantially less than 360 degrees/(number of rotor pole sectors 375), and many (4 to 32) stator poles 368 are provided for each rotor pole sector 375. Since the stator poles 368 are disposed at equal intervals around the motor longitudinal axis 358, at any point in rotation of the multipole rotor assembly 354 several stator poles 368 lying between rotor pole sectors 375 are without axially adjacent rotor pole sectors 375.

This relationship is shown in FIG. 13, where dashed radial construction lines 390, 391, and 392 extend from the motor longitudinal axis 358 along the margins of certain of the rotor pole sectors 375. Dashed lines 390 and 392 extend along the clockwise edges of two adjacent rotor pole sectors 375, and are separated by an angle Ø, which is of extent equal to 360 degrees/(number of rotor pole sectors 375).

A third dashed radial line 391 extends along the counter-clockwise edge of rotor pole sector 375 having construction line 390 at its clockwise margin. The angular extent of the included rotor pole sector 375 is measured from 390 to 391 and is $Ø_r$. It is apparent that $Ø_r$ is less than $Ø_t$, said difference being $Ø_g$. Dashed vertical construction lines are projected from corners of the rotor pole sectors 375 bounded by radial construction lines 390, 391, and 392, indicating the axial projection of rotor pole sectors 375 on the stator pole assembly 366. It is seen that between adjacent rotor pole sectors 375 is a gap of "uncovered" stator poles 368 and the extent of this gap is $Ø_g$.

Because flux transfers between rotor pole sectors 375 during commutation and flux transfers may not be instantaneous or simultaneous, influenced by stator winding inductance and driving circuit impedance interactions and ferromagnetic hysteresis effects in stator assembly 352 and multipole rotor assembly 354, commutation is usually the least predictable source of torque ripple. In the configuration of this invention commutation is caused to occur in windings between stator poles 368 which lie in the gap $Ø_g$ between rotor pole sectors 375 and thus not axially adjacent to rotor pole sectors 375. Thus the commutating flux that affects the rotor pole sectors 375 is weak fringing flux from relatively distant stator poles 368 and stator windings, not the intense flux in the low-reluctance narrow airgaps wherein the rotor pole sectors 375 axially overlie stator poles 368, and the influence of commutating flux changes on total multipole rotor assembly 354 torque is thereby substantially reduced.

An attractive attribute of the composite stator assembly 352 comprised of powdered ferromagnetic pole assembly 366, having a working permeability of about 500, and a wound cylindrical core 364 of ferromagnetic strip having a working permeability of 50,000 or more, is that almost all of the flux from the stator pole roots 372 penetrates the high-permeability cylindrical ferromagnetic strip core 364 axially and has little inclination to traverse circumferentially in the lower-permeability ferromagnetic powder pole assembly 366 to adjacent stator poles 368, limiting the influence of stator poles 368 which are commutating on adjacent stator poles 368 which are not. Magnetically isotropic materials such as metallic glasses are generally superior to common silicon steel strip as wound cylindrical cores 364, as silicon steel strip usually has much higher longitudinal than transverse permeability and encourages circumferential flux movement in the ferromagnetic powder pole assembly 366, circumferentially extending the magnetic influence of a commutating stator pole 368 to adjacent stator poles 368. Metallic glass also possesses greater pulse permeability than does silicon steel, facilitating generation of short flux pulses to manage bearing breakaway friction as described hereinabove.

The disposition of multipole rotor assembly 354 and stator poles 368 shown has further advantages in limiting the influence of commutation on torque ripple with the small oscillating angular excursions characteristic of a rotary acoustic transducer assembly 21, as described hereinbelow.

FIG. 14 is an example of a stator winding pattern 400 of this invention, presented in a traditional highly schematized way, and its driving electronics. A multipole rotor assembly 354 is surrounded by a plane representation of a stator pole assembly 366 (FIG. 13) having 48 stator pole faces 372 between which there are stator winding slots 370. As shown here, there are two groups of windings—the main windings 401 which ultimately, with the multipole rotor assembly 354 components, generate almost all of the motor torque, and the pulse windings 402, used for bearing breakaway friction management, which will be described hereinbelow. Both winding sets, main and pulse, share a common ground 404.

Individual winding conductors 406 of the main drive winding set 401 have, in this example, a wave winding pattern. Each of the 12 main winding conductors 406 is terminated in a terminal 410 and the common ground line 404. Each individual winding conductor 406 leaves a terminal 410 and traverses the stator pole assembly 366 winding slots 370 in such a way that the individual winding conductor 406 passes between the stator poles 368 in alternating radial directions, i.e., inner circumference to outer circumference followed by outer circumference to inner, and so forth until the individual winding conductor 406 returns to the common ground 404. For example, specific individual winding conductor 412 leaves terminal 420 and follows the path 421, 422, . . . 428 in numerical sequence, returning to the common ground 404. Though represented here as single turn for simplicity, in practice each of the main windings 401 will usually be comprised of many turns through the stator slots 370.

Each of the plurality of main drive windings 401 described hereinabove is driven by an individual power amplifier 429 controlled by electronics comprised of a position sensor 24 (not shown), a microcomputer 430, a D/A converter 432, and a microcomputer 430-controlled multiplexer 434 which distributes driving signals to individual power amplifiers 429 and thence to main windings 401. Torque control and rotor assembly 354 position information enter the microcomputer 430 on lines 435 and 436, respectively. Digital signals for individual stator main windings 401 pass through control line 437 to be converted to analog information on line 438. Main stator winding 401 selection addresses are on lines 439. Appropriate power amplifiers are economically available in groups of four amplifiers in a single integrated circuit, intended for use in automobile stereo radio receivers.

The multiturn main windings 401 have significant inductance and are difficult to drive with the brief pulses necessary to overcome breakaway friction as described hereinabove. In a d'Arsonval galvanometer noncommutating torque motor as described hereinabove (FIG. 9) or the multipole brushless electric motor 350 configuration described immediately above (FIG. 13), the bearing breakaway friction is roughly 60 db. below maximum motor torque. This low-level torque may be delivered by pulse windings 402 having single conductor turns and sharing the same rotor assembly 354 and stator pole assembly 366 with the main drive windings 401 as shown in FIG. 14. A typical pulse winding 402 path is 441, 442, . . . 448, in numerical sequence, in all traverses of the stator pole assembly 366 the pulse winding 402 overlapping a main winding 401 in the same stator slot 366, as shown at 442, 444, 446, and 448. The pulse windings 402 may be driven by low-power circuitry (not shown) having greater speed than is economically attractive in main winding individual power amplifiers 429.

In the pulse winding 402 example shown, with a multipole rotor assembly 354 as shown in this FIG. 14, only two pulse windings 402 are necessary, as the two pulse windings 402 may be so disposed in the stator pole assembly 366 that for the ordinary angular rotation of a two-moving-vane rotary acoustic radiator 22, which is of the order of 100 to 130 degrees, one of the pulse windings 402 will always lie under a rotor pole sector 375 and thus be capable of generating multipole rotor assembly 354 torque. Such a disposition is indicated by the short radial lines 451,452 on the rotor pole sectors 375 in FIG. 14, indicating angular disposition of pulse windings 402 in stator slots 442 and 458 when the multipole rotor assembly 354 is centered. It may be seen that if the multipole rotor assembly 354 rotates up to 60 degrees counterclockwise (each rotor pole sector 375 of this example subtends 67.5 degrees), the pulse winding at disposed in the stator slot 370 at 442 will remain subtended by the rotor pole sector 375 bearing line 451.

Counterclockwise rotation will maintain an equivalent relationship between pulse winding at 458 and its subtending rotor pole sector 375 bearing line 452. Commutation between these two pulse windings 402 is straightforward, using only a single bit of rotational position information which may be derived from the angle registers in the microcomputer 81 (FIG. 2a).

A further simplification can reduce the pulse windings from two to a single winding centered under the rotor pole sectors 375 at rest and driven only if the resting rotor pole sector 375 subtends the pulse winding, i.e., for the rotor pole sector 375 to "uncover" the pulse winding requires multipole rotor assembly 354 angular excursions of roughly ±30 degrees, within 6 db. of maximum output (±60 degrees). At this multipole rotor assembly 354 excursion level bearing static frictional effects are therefore 54 db. down (6db–60db), unlikely to be noticed if the pulse windings are not energized at all.

In a rotary acoustic transducer assembly 21 the amplitude of rotation decreases with frequency for a given perceived sound level, the lowest-audible-frequency sounds are not commonly present, and most listening is done at levels 10 to 30 db below peak. The consequence of these factors is that most multipole rotor assembly 354 excursions are of the order of 10 percent or less of maximum. The rotor pole sector 375 and stator assembly 352 configuration of FIG. 13 has considerable potential for reduction of torque ripple and attendant sound distortion if hysteresis is introduced into stator pole commutation.

Figure 15B:
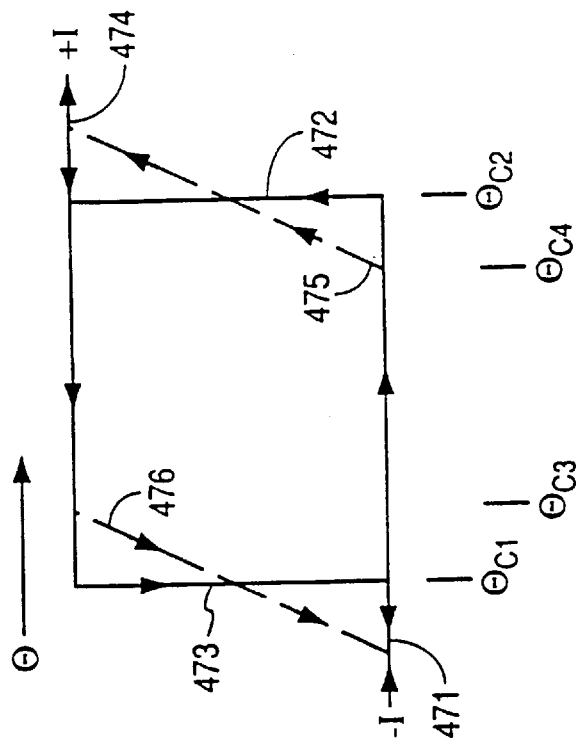
FIG. 15b is a schematic representation of stator winding driving current commutation transitions of an electronically commutated brushless electric motor of the present invention in which hysteresis has been introduced to said commutation transitions.
Figure 15A:
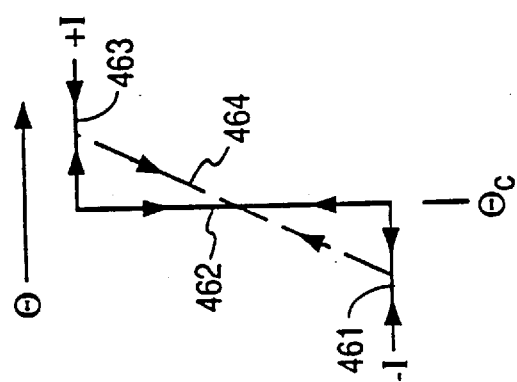
FIG. 15a is a schematic representation of stator winding driving current commutation transitions of a typical electronically commutated brushless electric motor.

FIG. 15a is a schematic representation of traditional electronic commutation. The stator main winding 401 current I, varying from –I to +I, is shown along the ordinate and the abscissa is multipole rotor assembly 354 angular position $\emptyset$. As $\emptyset$ increases, at some position $\emptyset_c$ the polarity of stator main winding current I reverses from –I to +I. The current I path as f($\emptyset$) is 461, 462, 463. When the multipole rotor assembly 354 rotation reverses the stator main winding 401 current I is reversed at the same rotational point $\emptyset_c$ and the path as f($\emptyset$) is 463, 462, 461. This retrace of the identical path is idealized, and, as has been described hereinabove, is generally not achieved primarily because of stator winding inductance and driving source impedance interactions and stator assembly hysteresis: the consequence is commutation torque ripple. Flux may be reversed gradually, over a period greater than that of the stator main winding 401 inductance and driving amplifier 429 impedance time constant, in order to minimize these effects, as suggested by the bidirectional dashed line 464, but the effect may be to create an effective gap in motor torque as commutating windings are midway through the current transition.

The current paths for changes in the two transitions –I to +I and +I to –I may be rotationally separated as shown in FIG. 15b. Here the –I to +I transition is at rotational position $\emptyset_{c2}$, following path 471, 472, 474 as f($\emptyset$) and the +I to –I transition is at $\emptyset_{c1}$ following path 474, 473, 471 as f($\emptyset$). The consequence of this commutation hysteresis between $\emptyset c1$ and $\emptyset c2$ is that the multipole rotor assembly 354 may rotate between $\emptyset_{c1}$ and $\emptyset_{c2}$ without commutating at all, thus introducing no commutation torque ripple to the multipole rotor assembly 354, and no distortion from this source. Gradual commutation as suggested by paths 475 and 476, may be used to reduce inductive effects in the overall stator magnetic field as commutation occurs where rotor pole sectors 375 do not subtend the commutating stator poles 368, though the commutation-free region is reduced to the angular sector between $\emptyset_{c3}$ and $\emptyset_{c4}$.

In a typical application to a rotary acoustic transducer assembly 21 a hysteresis angle $\emptyset_{c2}$–$\emptyset_{c1}$ might be 7.5 degrees, equal to the width of a stator pole 368 and adjacent stator slot 370 in the 48-pole example as described in FIGS. 13 and 14. This would mean that at the lowest frequency of 20 Hz, where the maximum multipole rotor assembly 354 excursion is perhaps 120 degrees, commutation would become limited starting at –24 db (16:1 down) from peak output; at 80 Hz, where multipole rotor assembly 354 excursion is reduced by 4:1, the transition would start to occur at –12 db. (only 4:1 down) from peak output. With sound output levels 6 db. further down, commutation ceases altogether. At listening sound levels 10–30 db. below peak, which is where a high-quality brush-commutated motor produces distortion of unacceptable levels (10 percent or more) with further relative distortion increases with decreasing sound level, the brushless commutated motor of this invention is transitioning from a commutating region having distortion in the 1 percent region to a non-commutating state akin to that of the d'Arsondescribed galvanometer torque motor drive described hereinabove. There is no relative increase of commutation-induced distortion below –30 db. as there is no commutation in this region.

Torque ripple from sources other than commutation, such as uneven stator pole assembly flux distribution, persists when the motor is not commutating, but may be reduced in traditional ways, primarily, in an axial-gap brushless commutated torque motor 350 such as that of FIG. 13, by increasing the number of stator poles 368 and by skewing rotor pole sector 375 circumferential margins and stator poles 368 from their radial alignment in the plane normal to the motor longitudinal axis 358. Additional ripple-reduction techniques may include using rotor pole sectors 375 having differing angular extents and use of unequal angular disposition of diametrically-opposed rotor pole sector 375 pairs about the motor longitudinal axis 358, e.g., offsetting one diametrically opposed rotor pole sector 375 pair by half the combined width of a stator pole 368 and stator winding slot 370.

The axial-gap brushless commutated torque motor 350 described herein is a satisfactory alternative to a galvanometer-type torque motor drive for use in a rotary acoustic transducer assembly 21. Torque linearization techniques described hereinabove for the galvanometer-type torque motor are applicable and reduce distortion levels below the intrinsic level of the brushless commutated torque motor 350 and increase its linear torque range, as ferromagentic saturation effects can be partially compensated by changes in main stator winding 401 drive. These torque linearization techniques will compensate for the peculiarities of each individual motor, since each rotational position Ø within the operational range is individually mapped following motor assembly and periodically thereafter. Compensated motor peculiarities may include such mischances as a chip on a single stator pole 368 acquired during operational use. Provision of breakaway-friction flux pulses is simplified by the use of separate stator pulse windings 402.

In general, the apparatus of the present invention can be generally characterized as a rigidly structured microcomputer-controlled transducer comprised of rigid movable vanes rotating in a rigid ported cylinder having a variety of vane and port configurations which is capable of reproducing sound with low distortion from a high frequency crossover point of 80 Hz down to well below the 20 Hz lower limit of the audio frequency spectrum. Even in a small cabinet, the frequency response in and immediately below its working bandwidth is substantially flat and without resonances without use of negative feedback.

While this invention has been described in conjunction with a generally cylindrical chamber containing the rotatable shaft with movable vanes mounted thereto, naturally, the chamber could be of any other appropriate shape. For example a spherical chamber would be appropriate under certain circumstances or a toroidal chamber or portions thereof. For example the spherical chamber could be sliced such that the two ends of the sphere were removed to provide flat parallel surfaces leaving a center spherical portion with flat ends.

Figure 16:
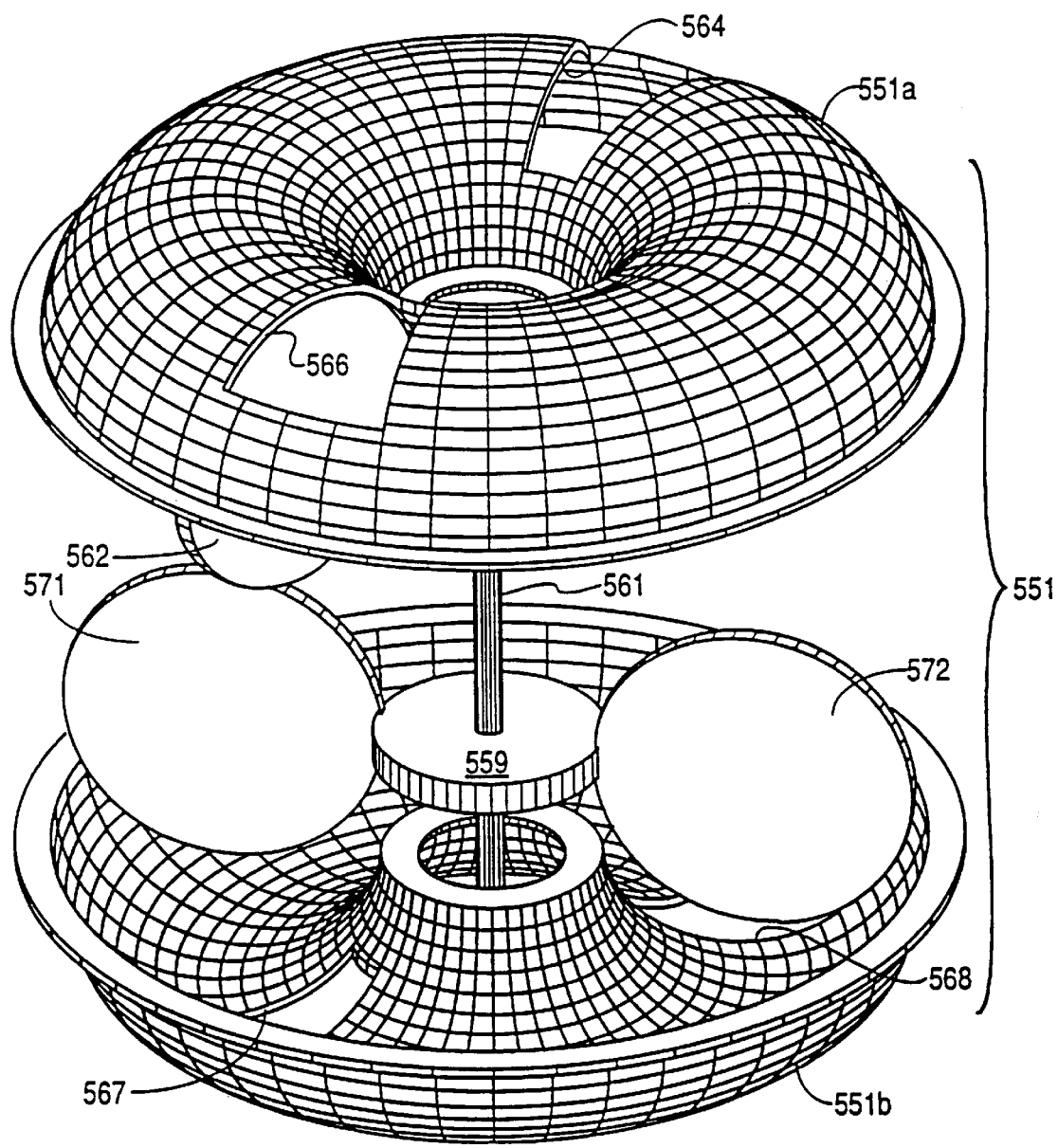
FIG. 16 is a computer-aided wireframe isometric partially exploded view of rotary acoustic radiator having a generally spherical chamber with flattened axial ends.
Figure 17:
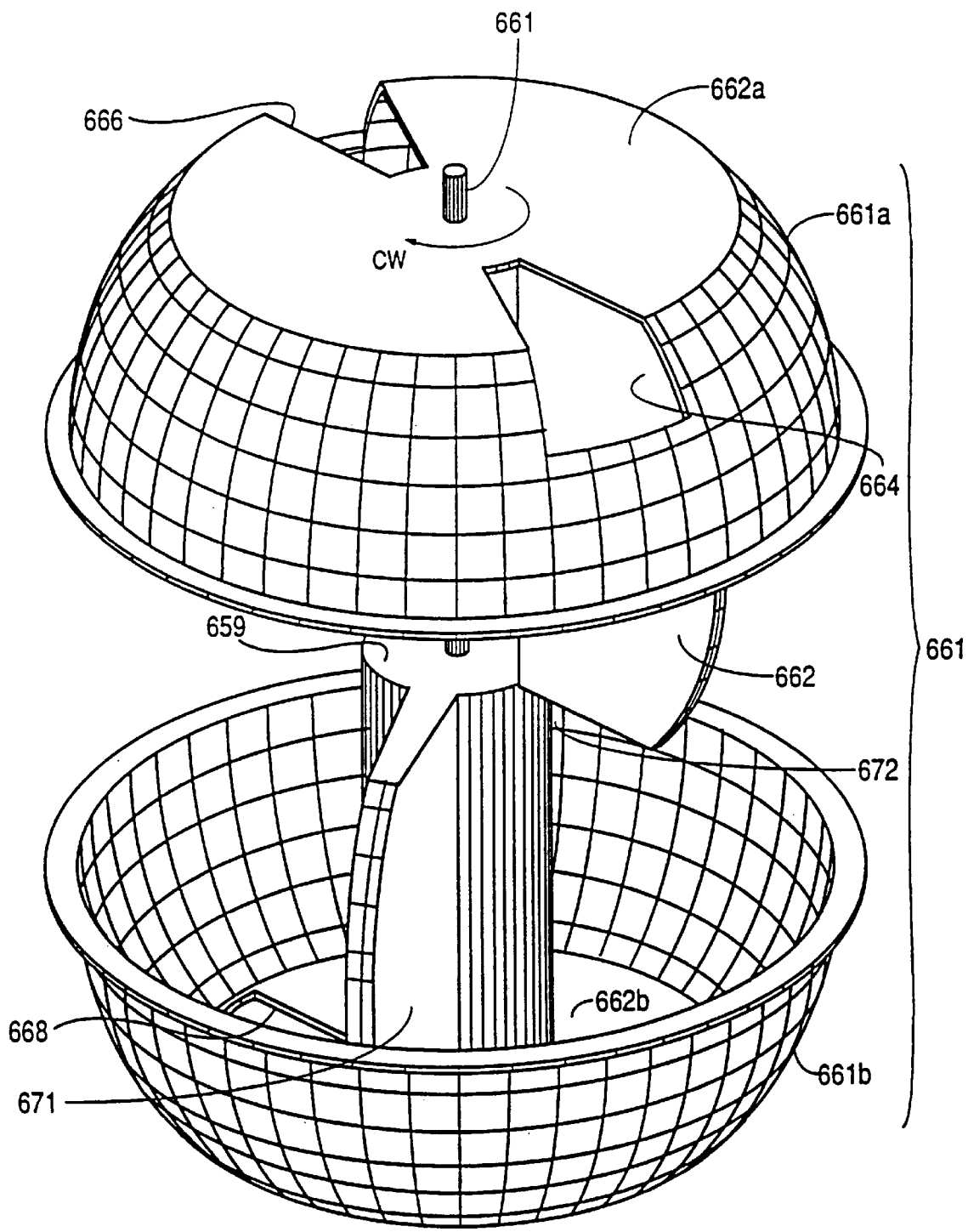
FIG. 17 is a computer-aided wireframe isometric partially exploded view of rotary acoustic radiator having a toroidal chamber.

Two representations of alternate ported chamber shapes are shown in FIGS. 16 and 17, having as chambers respectively a toroid of circular radial cross-section and a truncated spherical segment with parallel plane axial ends.

FIG. 16 illustrates in an exploded view a toroidal chamber incorporating the principals of this invention.

In FIG. 16, a toroidal chamber 551 includes an upper half 551*a* and a lower half 551*b*. Within chamber 551 are mounted movable vanes 571 and 572 connected by means of disk 559 to shaft 561. Shaft 561 is connected to a motor (not shown) which causes shaft 561 to rotate in an oscillatory manner thereby to cause vanes 571 and 572 to first move in a clockwise direction and then in a counter clockwise direction about shaft 561. Openings 567 and 568 in bottom half of toroid 551*b* allow air to be either moved out of the toroidal chamber 551 or drawn into the toroidal chamber 551 in response to moveable vanes 571 or 572 moving toward or away from the corresponding opening. Openings 566 and 564 in the top half 551a of toroid chamber 551 serve these same functions. Stationary vane 562 is shown mounted to the interior surface of the top half of 551*a* of toroidal chamber 551 just adjacent to port 566. Thus, when moveable vane 572 approaches stationary vane 562, air is forced out of the toroidal chamber 551 through port 566. Simultaneously, as movable vane 571 approaches port 564, a stationary vane 563 (not shown) mounted adjacent to port 564 diametrically opposite to stationary vane 562 forces the air being displaced by moveable vane 571 as it moves toward port 564 out through port 564. While vane 571 is moving toward port 564, air is drawn in through port 567 in the bottom half of 551*b* of toroidal chamber 551 and simultaneously as movable vane 572 moves toward port 566, air is drawn into the toroidal chamber through port 568 in bottom half 551b of toroidal chamber 551. Stationary vanes 562 and 563 (not shown) are also connected to the interior surface of the bottom half 551b of the toroidal chamber 551 in such a manner as to force air being displaced by movable vane 572 as moveable vane 572 moves toward stationary vane 562 out of chamber 551 through port 566 and not through port 567.

FIG. 17 illustrates in exploded view spherical chamber 661 comprised of a sphere, the top and bottom sections of which have been removed to form a plane upper surface 662*a* and a plane lower surface 662*b* parallel to the upper surface 662*a*. Surfaces 662*a* and 662*b* are both perpendicular to the axis of rotatable shaft 661. Movable vanes 671 and 672 are mounted on rotatable shaft 661 by means of hub 659 which is affixed to shaft 661. When shaft 661 is rotated in an oscillatory manner by a motor (not shown) movable vanes 671 and 672 rotate first in one direction and then in the opposite direction. Stationary vane 662 and a diametrically opposite corresponding stationary vane 663 (not shown) are affixed to the interior surface of chamber 661. Stationary vanes 662 and 663 force air out of the interior chamber 661 or allow air to be drawn into chamber 661 through ports 664, 666, 668 and 670 (not shown) depending upon the direction of rotation of shaft 661 and movable vanes 671 and 672. Thus, as movable vane 671 is rotated toward stationary vane 662 (which is attached to the interior surface of both lower half 661*b* of the spheroidal chamber and upper half 661*a* of the spherical chamber), air is forced out of chamber 661 through port 664. Air is also forced out of chamber 661 through port 666 by movable vane 672. When shaft 661 is rotating in the opposite direction, air is drawn into chamber 661 through ports 664 and 666 and forced out of chamber 661 through port 668 and a diametrically opposite port (670 not shown) on the side of the bottom portion 662*b* of chamber 661 opposite port 668.

The embodiments of FIGS. 16 and 17 illustrate two rotary acoustic radiators in accordance with the principals of this invention.

While certain embodiments of this invention have been described, other embodiments of this invention will be obvious in view of the above description. Numerous changes and modifications can be made in the embodiments disclosed without departing from the invention.

What is claimed is:

1. A rotary acoustic transducer apparatus for producing sound in response to an applied electrical signal, comprising:

a rotary acoustic radiator assembly comprising:
        a generally cylindrical chamber with a cylindrical sidewall and end walls having an axis,
        a shaft,
        bearings mounting said shaft in said cylindrical means for rotation about said axis,
        a cylindrical hub secured to said shaft and extending between said end walls,
        movable vanes secured to said shaft,
        said shaft, said hub, and said movable vanes forming a rotor assembly,
    stationary vanes mounted in said chamber between said movable vanes and extending between said cylindrical sidewall and said hub and between said end walls, said cylindrical chamber having ports opening through the walls of said cylindrical chamber to direct air flow into and out of the cylinder in response to movement of the movable vanes, a torque motor coupled to the shaft for applying rotational reciprocating movement to the rotor assembly, a position encoder for ascertaining the position of said rotor assembly, and a microcomputer operatively coupled to said torque motor and to said position encoder for generating a drive signal to drive said torque motor from said applied electrical signal and from corrections to said applied electrical signal derived by said microcomputer.

2. Apparatus as in claim 1 including a cabinet in the user environment and means for mounting said rotary acoustic radiator assembly in operative relation to said cabinet so that certain of said ports open into the cabinet and certain of said ports open externally of the cabinet and produce an air flow into and out of the user environment upon rotation of said rotor assembly.

3. Apparatus as in claim 1 including a diffuser attenuator means disposed in the vicinity of said rotary acoustic radiator for redirecting and slowing air flow to and from ports opening into the user environment.

4. Apparatus as in claim 3 wherein the diffuser attenuator means includes acoustic absorbent material to reduce noise in the air flow passing through the diffuser attenuator.

5. Apparatus as in claim 1 wherein the microcomputer includes means for generating a centering signal in the drive signal to the torque motor for maintaining the average position of the rotor assembly in the center of its rotational travel arc limits.

6. Apparatus as in claim 1 wherein the microcomputer includes means for preventing contact of the moving vanes of the rotor assembly and the stationary vanes by appropriately modifying said drive signal.

7. Apparatus as in claim 1 wherein the microcomputer includes means for calibrating motor torque linearity as a function of rotational position of said rotor assembly and for operating on the applied electrical signal to compensate for any torque motor nonlinearity.

8. Apparatus as in claim 1 wherein the microcomputer includes means for measuring air compliance as a function of the position of the rotor assembly and operating on the applied electrical signal to compensate for any air compliance nonlinearity.

9. Apparatus as in claim 1 wherein the microcomputer includes means for measuring air leakage as a function of rotor assembly position and operating on the applied electrical signal to compensate for the leakage.

10. Apparatus as in claim 1 wherein the microcomputer includes means for measuring bearing breakaway friction as a function of both the extent and velocity of bearing rotation prior to stop and of the duration of the bearing stop at local peaks and plateaus of the applied electrical signal, and operating on the applied electrical signal to provide said drive signal to the torque motor which produces torque when bearing rotation resumes to overcome the bearing breakaway friction.

11. Apparatus as in claim 1 wherein the microcomputer includes means for providing an infrasonic signal as part of the drive signal to the torque motor to continue bearing rotation at peaks and plateaus in said applied electrical signal to forestall extended bearing non-rotation.

12. Apparatus as in claim 1 including means for delaying a few milliseconds said applied electrical signal to facilitate bearing breakaway friction management by sampling and assessing the applied electrical signal prior to its being supplied to the torque motor by the microcomputer.

13. Apparatus as in claim 1 wherein the microcomputer includes means for sensing torque motor armature temperature and cooling the torque motor by providing an infrasonic signal as part of the drive signal to the torque motor to produce infrasonic oscillation of the rotor assembly.

14. Apparatus as in claim 5 wherein the microcomputer includes means for generating an infrasonic signal to modulate the centering signal in the drive signal to the torque motor so that the operating center of said torque motor and rotor assembly wanders slowly about an index position to distribute bearing wear.

15. A rotary acoustic radiator assembly for producing sound in response to a reciprocating rotational movement of a torque motor driven by an applied electrical signal, said rotary acoustic radiator assembly comprising:

a generally cylindrical chamber with a cylindrical sidewall and end walls, said chamber having an axis;

a shaft;

bearings mounting said shaft in said cylindrical chamber for rotation about said axis;

a cylindrical hub secured to said shaft and extending between said end walls;

movable vanes secured to said shaft;

said shaft, said hub, and said movable vanes forming a rotor assembly;

stationary vanes mounted in said chamber between said movable vanes and extending between said cylindrical sidewall and said hub and between said end walls;

said cylindrical chamber having ports opening through the end walls of said cylindrical chamber adjacent to each stationary vane, each stationary vane having associated therewith a port in an end wall on one side of said stationary vane and a port in the other end wall on the other side of said stationary vane to permit air flow into and out of the cylinder in response to movement of the movable vanes.

16. A rotary acoustic radiator assembly for producing sound in response to a reciprocating rotational movement of a torque motor driven by an applied electrical signal, said rotary acoustic radiator assembly comprising:

a generally cylindrical chamber with a cylindrical sidewall and end walls, said chamber having an axis;

a shaft;

bearings mounting said shaft in said cylindrical chamber for rotation about said axis;

a cylindrical hub secured to said shaft and extending between said end walls;

movable vanes secured to said shaft;

said shaft, said hub, and said movable vanes forming a rotor assembly;

stationary vanes mounted in said chamber between said movable vanes and extending between said cylindrical sidewall and said hub and between said end walls;

said cylindrical chamber having ports opening through the end walls of said cylindrical chamber adjacent to each stationary vane, each stationary vane having associated therewith a port in an end wall on one side of said stationary vane and a port in the other end wall on the other side of said stationary vane to permit air flow into and out of the cylinder in response to movement of the movable vanes, said cylindrical chamber including additional ports formed in the cylindrical sidewall adjacent to each stationary vane.

17. A rotary acoustic radiator assembly for producing sound in response to a reciprocating rotational movement of a torque motor driven by an applied electrical signal, said rotary acoustic radiator assembly comprising:

a generally cylindrical chamber with a cylindrical sidewall and end walls having an axis;

a shaft;

bearings mounting said shaft in said cylindrical means for rotation about said axis;

a cylindrical hub secured to said shaft and extending between said end walls;

movable vanes secured to said shaft;

said shaft, said hub, and said movable vanes forming a rotor assembly;

stationary vanes mounted in said chamber between said movable vanes and extending between said cylindrical sidewall and said hub and between said end walls;

said cylindrical chamber having ports opening through the cylindrical chamber adjacent to each stationary vane, each stationary vane having associated therewith a sidewall port on one side of said stationary vane and an end wall port on the other side of said stationary vane to permit air flow into and out of the cylinder in response to movement of the movable vanes.

18. A rotary acoustic radiator assembly for producing sound in response to a reciprocating rotational movement of a torque motor driven by an electrical signal, said rotary acoustic radiator assembly comprising:

structure with a cylindrical sidewall and end walls forming a cylindrical chamber having an axis, a shaft, bearings mounting said shaft in said cylindrical chamber for rotation about said axis, a cylindrical hub secured to said shaft and extending between said end walls, movable vanes secured to said hub, said shaft, said hub, and said movable vanes forming a rotor assembly, stationary vanes mounted in said chamber between said movable vanes and extending between said cylindrical sidewall and said hub and between said end walls, each of said movable vanes and stationary vanes having a finite thickness and first and second faces and a center surface midway between said first and second faces, said center surface having at least four corners, at least one of said movable and stationary vanes having at least four corners of the center surface abutting the end walls, two corners abutting the cylindrical hub and two corners abutting the cylindrical sidewall, said center surface of each of said vanes being formed such that four planes, each defined by a line which is the chamber axis and by a point which is one of said four corners of said center surface, lie in more than one plane, said cylindrical chamber having ports opening through the walls of said cylindrical chamber to direct air flow into and out of the cylindrical chamber in response to movement of the movable vanes.

19. A rotary acoustic radiator assembly for producing sound in response to a reciprocating rotational movement of a torque motor driven by an electrical signal, said rotary acoustic radiator assembly comprising:

structure with a cylindrical sidewall and end walls forming a cylindrical chamber having an axis, a shaft, bearings mounting said shaft in said cylindrical chamber for rotation about said axis, movable vanes secured to said shaft, said shaft and said movable vanes forming a rotor assembly, stationary vanes mounted in said chamber between said movable vanes and extending between said cylindrical sidewall and said shaft and between said end walls, said cylindrical chamber having ports opening through at least one of the end walls and the sidewall and into said cylindrical chamber to permit air flow into and out of said cylindrical chamber in response to movement of the movable vanes, at least two of said ports in the cylindrical chamber walls being at least partially superposed in the same angular sector about the axis.

20. A rotary acoustic radiator assembly for producing sound in response to a reciprocating rotational movement of a torque motor driven by an electrical signal, said rotary acoustic radiator assembly comprising:

a structure with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said movable vanes and extending between said cylindrical sidewall and said hub and between said end walls, said cylindrical chamber having certain ports opening through an end wall of said cylindrical chamber to permit air flow into and out of the cylindrical chamber in response to movement of the movable vanes, said certain ports being arranged so that air flow therethrough passes through said torque motor for cooling the torque motor.

21. In a rotary acoustic transducer apparatus for producing sound in response to an applied audio signal, comprising:

a rotary acoustic radiator assembly and a torque motor, the rotary acoustic radiator assembly comprising a generally cylindrical structure with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said movable vanes and extending between said cylindrical sidewall and said hub and between said end walls, said cylindrical means having ports opening through at least certain of the walls to permit air flow into and out of the cylinder in response to movement of the movable vanes, said torque motor coupled to the shaft applying rotational reciprocating movement in accordance with said applied electrical signal, said torque motor including a torque motor shaft and an armature mounted on the shaft and a capstan formed of an insulating material mounted on said torque motor shaft, first and second conducting metal foil strips secured to said capstan at separate positions thereon having first ends connected to said armature and having second ends supported and tensioned individually by conductive leaf springs so that the capstan may rotate over a limited range while maintaining electrical continuity through said metal foil strips and leaf springs, and means connecting said leaf springs to the applied electrical signal.

22. A rotary acoustic transducer for producing sound in response to an electrical signal in a user environment, comprising:

a rotary acoustic radiator assembly and torque motor, the rotary acoustic radiator assembly comprising a generally cylindrical chamber with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said movable vanes and extending between said cylindrical sidewall and said hub and between said end walls, said cylindrical means having ports opening into said cylindrical chamber and into the user environment to permit air flow into and out of the cylindrical chamber in response to movement of the movable vanes, said torque motor being coupled to said shaft and applying rotational reciprocating movement in accordance with the applied electrical signal and diffuser attenuator means disposed in the vicinity of said acoustic radiator for redirecting and slowing air flow into and from ports opening into the user environment.

23. Apparatus as in claim 22 wherein the diffuser attenuator means includes acoustic absorbent material to reduce noise in the air flow passing through the diffuser attenuator.

24. In a method for producing low frequency sound from an applied electrical signal by the use of a rotary acoustic transducer apparatus comprising an enclosure providing a cylindrical chamber having one set of stationary vanes mounted therein and having a rotor assembly mounted therein having one set of movable vanes mounted thereon, the enclosure having ports therein in communication with the cylindrical chamber, torque motor means coupled to said rotor assembly for causing rotary reciprocating movement of said rotor assembly, and a microcomputer for receiving the applied electrical signal and for supplying a drive signal to the torque motor means, the microcomputer having a memory with at least one table of information having values stored therein related to a physical characteristic of the rotary acoustic transducer apparatus including rotor assembly position, the method comprising the steps of:

causing the microcomputer to sense the position of the rotor assembly and to read values from said at least one table, and utilizing the sensed rotor assembly position and the read values from said at least one table to control the operation of the rotor assembly.

25. The method as in claim 24 together with the step of:

measuring physical characteristics of the rotary acoustic transducer apparatus; and creating additional tables in microcomputer memory for reference during rotary acoustic transducer apparatus operation.

26. The method as in claim 25 together with the step of updating said additional tables in microcomputer memory during operation for reference during rotary acoustic transducer apparatus operation.

27. The method as in claim 26 wherein bearing means is provided for rotatably mounting the rotor assembly, said bearing means having breakaway friction, together with means for measuring the bearing breakaway friction as a function of the extent and velocity of rotation of the bearing prior to a stop, together with the steps of:

causing the microcomputer to measure the bearing breakaway friction; and operating on the applied electrical signal to provide torque when the bearing rotation is to resume after a stop to overcome the breakaway friction.

28. The method as in claim 26 together with the step of causing the microcomputer to cause generation of an infrasonic signal in the drive signal to the torque motor to continue bearing rotation at local waveform peaks of the electrical signal forestall extended bearing non-rotation.

29. The method as in claim 26 together with the step of causing the microcomputer to provide a delay in the drive signal supplied to the torque motor to facilitate bearing breakaway friction management by sampling and assessing the applied electrical signal prior to its being supplied to the torque motor.

30. The method as in claim 26 together with the step of:

causing the microcomputer to sense torque motor armature temperature and to generate an infrasonic signal in the drive signal in response to the measured armature temperature to produce infrasonic oscillation of the rotor assembly for cooling the torque motor.

31. The method as in claim 25 together with the step of causing the microcomputer to calibrate the linearity of the torque from the torque motor as a function of rotational position of the torque motor and operate on the applied electrical signal to compensate for any nonlinearity in the torque motor.

32. The method as in claim 25 together with the step of causing the microcomputer to measure air compliance in the chamber as a function of the position of the rotor assembly and operate on the applied electrical signal to compensate for any nonlinearities in the air compliance.

33. The method as in claim 25 together with the step of causing the microcomputer to measure vane and air leakage as a function of rotor assembly position and operate on the applied electrical signal to compensate for any measured leakage.

34. The method as in claim 24 together with the step of causing the microcomputer to generate centering signals in the drive signal to the torque motor to maintain the average position of the rotor assembly in the center of its rotational arc limits.

35. The method as in claim 34 together with the step of causing the microcomputer to generate an infrasonic signal to modulate the centering signals in the drive signal for the torque motor and rotor assembly so that the operating center of the rotor assembly wanders slowly to distribute bearing wear.

36. The method as in claim 24 together with the step of causing the microcomputer to prevent contact of the movable vanes of the rotor assembly and the stationary vanes by operating on the applied electrical signal.

37. A method for producing low frequency sound by the use of an applied electrical signal by the use of one set of stationary vanes and one set of movable vanes mounted in a cylindrical housing having at least one end wall having end ports therein, said method comprising:

moving the movable vanes in the housing in accordance with the applied electrical signal to cause the movable vanes to move towards and away from the stationary vanes to cause air flow to pass rapidly into and out of the end ports to create low frequency sound.

38. A method for producing low frequency sound by the use of an applied electrical signal by the use of one set of stationary vanes and one set of movable vanes mounted in a cylindrical housing having at least one end wall having end ports therein, said method comprising:

moving the movable vanes in the housing in accordance with the applied electrical signal to cause the movable vanes to move towards and away from the stationary vanes to cause air flow to pass into and out of the end ports to create low frequency sound and slowing and redirecting the air flow into and out of certain of said ports.

39. A method as in claim 38 together with the step of absorbing high frequency noise from the air flow into and out of certain of said ports.

40. A method as in claim 38 together with the step of screening the air flow into certain of said ports.

41. A rotary acoustic transducer apparatus for producing sound in response to an applied electrical signal, comprising:

a chamber having a wall or walls with ports opening through said wall or walls to allow air to flow into and out of the chamber;

a shaft, rotatably mounted on the axis of said chamber;

movable vanes secured to said shaft, thereby to form with said shaft a rotor assembly, stationary vanes mounted in said chamber between said movable vanes and extending between said wall or walls a motor coupled to said shaft for applying torque to the rotor assembly such that said torque generated by said motor in response to an electrical signal applies torque to the rotor assembly, causing the rotor assembly to rotate and therefore causing air to flow into and out of the chamber, producing sound.

42. Apparatus as in claim 41 wherein said chamber is spherical.

43. Apparatus as in claim 41 wherein said chamber is toroidal.

44. Apparatus as in claim 41 wherein said chamber has a surface other than a cylinder defined by the perimeter of an area rotated about said axis which lies in the same plane as the area.

45. A rotary acoustic radiator assembly for producing sound in response to a reciprocating rotational movement of a torque motor driven by an electrical signal, said rotary acoustic radiator assembly comprising:

structure with a chamber mounted about a longitudinal axis, said chamber having a wall;

a shaft mounted along said axis so as to be capable of rotating about said axis;

moveable vanes secured to said shaft;

said shaft and said moveable vanes forming a rotor assembly;

stationary vanes mounted in said chamber on said wall between said moveable vanes and extending between said wall and said shaft, each of said moveable vanes and stationary vanes having a finite thickness and first and second faces and a virtual surface which is the locus of all points midway between said first and second faces, said virtual surface having an edge, said edge having at least three points on said edge such that at least one of said moveable and stationary vanes has the virtual surface formed such that at least three planes each defined by the longitudinal axis and by one of the three points on the edge lie in more than one plane, said chamber having ports opening through the wall of said chamber to direct airflow into and out of the chamber in response to movement of the moveable vanes.

* * * * *